US010606603B1

(12) United States Patent
Tao

(10) Patent No.: US 10,606,603 B1
(45) Date of Patent: Mar. 31, 2020

(54) METHODS AND APPARATUS FOR FACILITATING A MEMORY MIS-SPECULATION RECOVERY

(71) Applicant: Ye Tao, Shrewsbury, MA (US)

(72) Inventor: Ye Tao, Shrewsbury, MA (US)

(*) Notice: Subject to any disclaimer, the term of this patent is extended or adjusted under 35 U.S.C. 154(b) by 0 days.

(21) Appl. No.: 16/378,514

(22) Filed: Apr. 8, 2019

(51) Int. Cl.
G06F 9/38 (2018.01)

(52) U.S. Cl.
CPC .......... G06F 9/3842 (2013.01); G06F 9/3838 (2013.01)

(58) Field of Classification Search
CPC .............................. G06F 9/3838; G06F 9/3842
See application file for complete search history.

(56) References Cited

U.S. PATENT DOCUMENTS

| | | | | |
|---|---|---|---|---|
| 8,918,625 B1* | 12/2014 | O'Bleness | ............ | G06F 9/3834 712/214 |
| 2002/0178349 A1* | 11/2002 | Shibayama | ............ | G06F 9/383 712/235 |
| 2004/0255101 A1* | 12/2004 | Filippo | ................ | G06F 9/3842 712/225 |
| 2006/0095734 A1* | 5/2006 | Filippo | ................ | G06F 9/3838 712/218 |
| 2010/0332806 A1* | 12/2010 | Golla | .................... | G06F 9/3838 712/216 |
| 2013/0159679 A1* | 6/2013 | McCormick, Jr. | .......................... | G06F 9/30043 712/220 |
| 2013/0166881 A1* | 6/2013 | Choquette | ............. | G06F 9/3802 712/206 |

* cited by examiner

Primary Examiner — Michael J Metzger
(74) Attorney, Agent, or Firm — Kanika Radhakrishnan; Evergreen Valley Law Group

(57) ABSTRACT

Embodiments provide methods and apparatus for facilitating a memory mis-speculation recovery. The method includes detecting a speculative load and a set of speculative load dependent instructions and creating a Load Recovery Metadata (LRM) including an information for instruction re-execution for the speculative load. The method includes creating a set of Dependent Recovery Metadata (DRM). Each DRM of the set of DRM corresponds to each speculative load dependent instruction. A DRM includes an information for instruction re-execution for a speculative load dependent instruction. The method includes creating a Load Dependency Data (LDD) including information of the LRM and information of the set of DRM. The method includes detecting the speculative load as a mis-speculated load. The method includes re-executing the mis-speculated load and the set of speculative load dependent instructions. The re-execution includes utilizing the LDD to fetch the information of the LRM and the information of the set of DRM.

24 Claims, 16 Drawing Sheets

METHODS AND APPARATUS FOR FACILITATING A MEMORY MIS-SPECULATION RECOVERY

TECHNICAL FIELD

The present disclosure relates to a computer architecture and, more particularly to, methods and apparatus for facilitating advanced architecture for a memory mis-speculation recovery.

BACKGROUND

The need for faster and more energy efficient processing of computer instructions has typically been at the forefront of development in processors and data processing systems. Traditional processors execute instructions in sequential order, i.e., subsequent instructions are executed only after the execution of the previous instruction is done. The effective execution speed of computer processors may be increased by speculative execution in which computer instructions are executed once the data necessary for that execution is available, even when previous instruction has not been executed. Speculation is particularly useful on handling branch instructions and memory instructions, which provides major performance advantages.

An example of speculative execution is branch prediction. In branch prediction, the processor predicts which path of a program branch to take and continues execution on the predicted path before the target of the branch instruction is computed. Other types of speculation include value prediction (predicting the value of a variable used by an arithmetic operation before it has been fetched or computed) and load-store dependence prediction (predicting that a variable value will not change from the execution of earlier instructions). Memory speculation is a performance enhancement feature that allows younger memory instructions to execute speculatively before all older memory instructions complete. For instance, the load instructions are often followed by instructions consuming data from them. By allowing load instructions to execute speculatively in advance, load data can be returned to its consumer instructions sooner, which offers a performance gain.

Correctness issues may occur when allowing a load instruction to execute speculatively before all older memory instructions complete. This would be an event when the speculation is in error (i.e., mis-speculation). For example, in a system that allows load instructions to execute speculatively before all older memory instructions have their address calculated, a load instruction may get executed while an older store instruction eventually targeting the same memory location is waiting for an address calculation. In such a case, the load instruction fails to see the latest update provided by the older store instruction. This further leads to stale data being returned and used by all its consumer instructions. Such speculatively executed instructions must be undone and the execution needs to be recovered. This process is done by returning the processor to a valid state before execution of the speculative instructions so that the correct instructions can be executed.

To maintain program correctness, current mis-speculation recovery mechanisms include a plurality of steps to be implemented to recover execution status back to a valid state. The steps include discarding all results and data inflight starting from the mis-speculated instruction in program order, redirecting control flow and restarting execution from the mis-speculated instruction detected in the previous step. After discarding all results from the mis-speculated instruction in program order, the execution status is reset to the last valid state. That is because all the results generated before the mis-speculated instruction must be valid and results and data inflight generated from and after the mis-speculated instruction must be all abandoned.

However, results and data that are completely independent of the mis-speculated load also get cleared and re-computed during discarding and regeneration of all results and data inflight starting from the mis-speculated load. This hugely affects the performance and the power efficiency of the processor for recovering from load mis-speculation. These inefficiencies further get widened up with the trend of increased depths of processor's internal buffers and issuing widths, which allows more instructions inflight and potentially more useful work (i.e., the independent data and its results) gets wasted.

Accordingly, techniques are desired for recovering from load mis-speculation execution that require less processing power such that only the affected instructions that either directly or indirectly consume data from the speculative load are re-executed instead of discarding and re-executing all instructions after the mis-speculated load.

SUMMARY

Various embodiments of the present disclosure provide apparatuses, systems, methods, electronic devices and computer program products for facilitating a memory mis-speculation recovery.

In an embodiment, a computer-implemented method is disclosed. The method includes detecting from a set of instructions in a program flow, by a processor, a speculative load and a set of speculative load dependent instructions. The method includes creating, by the processor, a Load Recovery Metadata (LRM). The LRM includes an information for instruction re-execution for the speculative load. The method includes creating, by the processor, a set of Dependent Recovery Metadata (DRM). Each DRM of the set of DRM corresponds to each speculative load dependent instruction of the set of speculative load dependent instructions. A DRM of the set of DRM includes an information for instruction re-execution for a speculative load dependent instruction of the set of speculative load dependent instructions. The method includes creating, by the processor, a Load Dependency Data (LDD). The LDD includes an information of the LRM and an information of the set of DRM. The method includes detecting, by the processor, the speculative load as a mis-speculated load. The method includes re-executing, by the processor, the mis-speculated load and the set of speculative load dependent instructions. The re-execution includes utilizing the LDD to fetch the information of the LRM and the information of the set of DRM.

In another embodiment, an apparatus is provided. The apparatus includes a memory including executable instructions and a processor. The processor is configured to execute the instructions to cause the apparatus to at least detect from a set of instructions in a program flow, a speculative load and a set of speculative load dependent instructions The apparatus is further caused to create an LRM. The LRM includes an information for instruction re-execution for the speculative load. The apparatus is further caused to create a set of DRM. Each DRM of the set of DRM corresponds to each speculative load dependent instruction of the set of speculative load dependent instructions. A DRM of the set of DRM includes an information for instruction re-execution for a speculative load dependent instruction of the set of speculative load dependent instructions. The apparatus is further caused to create an LDD. The LDD includes an information of the LRM and an information of the set of DRM. The apparatus is further caused to detect the speculative load as a mis-speculated load. The apparatus is further caused to re-execute the mis-speculated load and the set of speculative load dependent instructions. The re-execution includes utilizing the LDD to fetch the information of the LRM and the information of the set of DRM.

In yet another embodiment, a computer-implemented method is disclosed. The method includes detecting, by a processor, a speculative load as a mis-speculated load. The method includes detecting from a set of instructions in a program flow, by the processor, a set of speculative load dependent instructions. The method includes setting, by the processor, a re-execution hint to valid for an instruction from the set of multiple speculative load dependent instructions. The instruction is dependent on one or more speculative loads and a speculative load from the one or more speculative loads is a current instruction and the speculative load is the mis-speculated load at the instruction commit stage. The method includes re-executing, by the processor, a speculative load dependent instruction from the set of speculative load dependent instructions based on reading the re-execution hint set as valid. The speculative load dependent instruction is dependent only on the speculative load.

In yet another embodiment, a computer program product including at least one computer-readable storage medium. The computer-readable storage medium includes a set of instructions, which, when executed by one or more processors, cause an apparatus to at least detect from a set of instructions in a program flow, a speculative load and a set of speculative load dependent instructions. The apparatus is further caused to create an LRM. The LRM includes an information for instruction re-execution for the speculative load. The apparatus is further caused to create a set of DRM. Each DRM of the set of DRM corresponds to each speculative load dependent instruction of the set of speculative load dependent instructions. A DRM of the set of DRM includes an information for instruction re-execution for a speculative load dependent instruction of the set of speculative load dependent instructions. The apparatus is further caused to create an LDD. The LDD includes an information of the LRM and an information of the set of DRM. The apparatus is further caused to detect the speculative load as a mis-speculated load. The apparatus is further caused to re-execute the mis-speculated load and the set of speculative load dependent instructions. The re-execution includes utilizing the LDD to fetch the information of the LRM and the information of the set of DRM.

BRIEF DESCRIPTION OF THE FIGURES

For a more complete understanding of example embodiments of the present technology, reference is now made to the following descriptions taken in connection with the accompanying drawings in which.

Figure 1A:
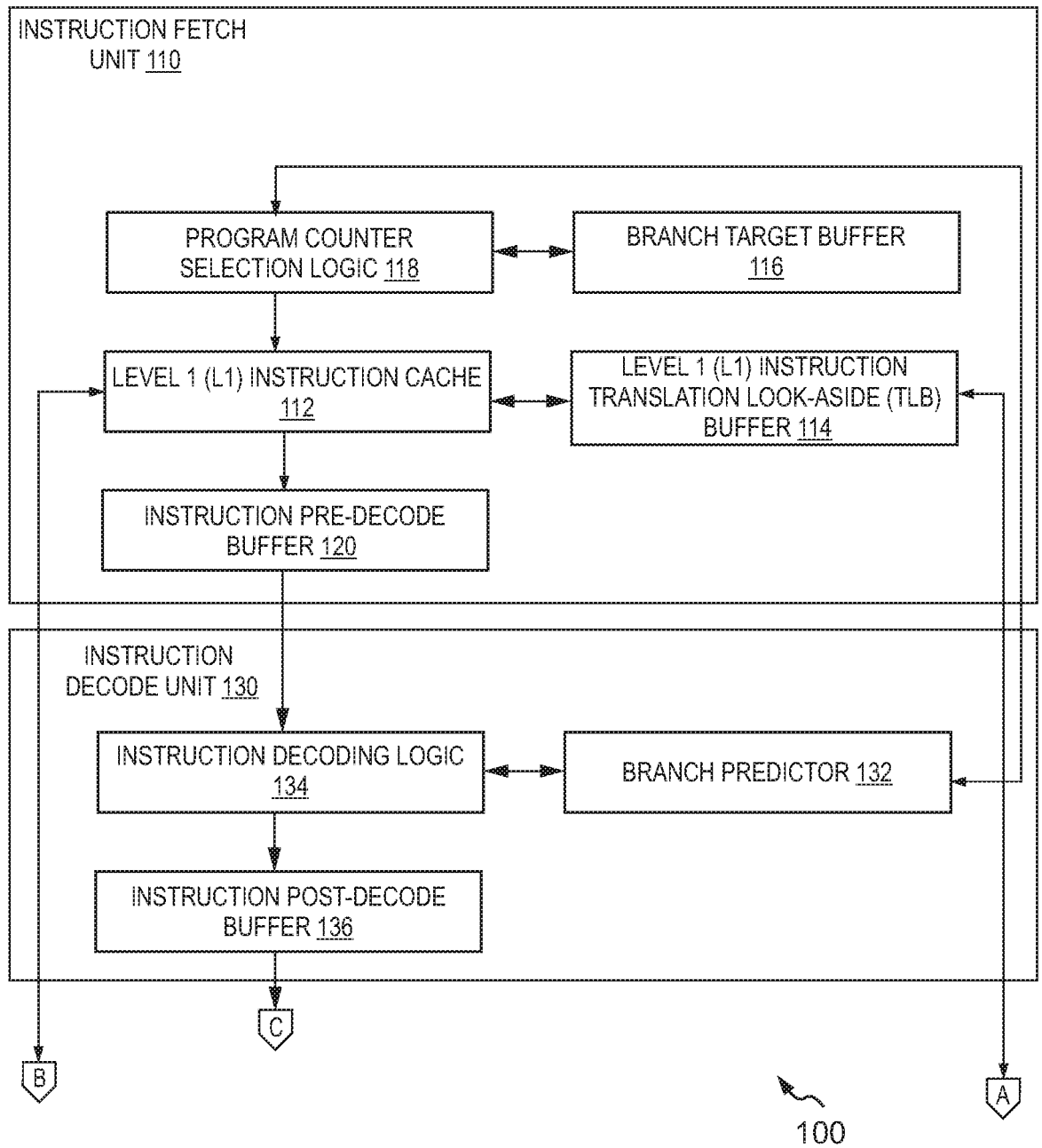
FIGS. 1A, 1B and 1C illustrate an exemplary representation of a processor related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Embodiments of the disclosure describe methods, diagrams and apparatuses for a better performed and low penalty approach for a load mis-speculation recovery. Several terms of the art are used throughout the description, which are to take on their ordinary meaning in the art, unless specifically defined herein. For the simplicity and ease of readability, in some cases, the term "speculatively executed load instructions" is abbreviated to "speculative loads", "speculated loads", "speculated load execution", "memory speculation" and "speculated execution". The term "instructions either directly or indirectly depending on a speculatively executed load instruction" is referred as "instructions that are dependent on a speculative load". The term "instructions in commit" is to be construed as "instructions currently processed by a commit logic". "Look up information used to identify an entry stored in a memory file" is also called "index of an entry". Further, the terms "older instructions and younger instructions" are alternatively referred as "earlier instructions and later instructions in program order" respectively. Further, the term "load-dependent instructions" means "instructions that either directly or indirectly consume data from that speculatively load". Similarly, the phrase "an instruction A is dependent on instruction B" means "instruction A either directly or indirectly consumes data from instruction B".

Overview

Various example embodiments of the present disclosure provide methods, systems, apparatuses and computer program products for facilitating a memory mis-speculation recovery in processors with support of speculative execution.

In various example embodiments, the present disclosure facilitates an apparatus for tracking dependencies between instruction streams and associated speculative load instructions to effectively reduce the load mis-speculation penalty by only re-executing dependent instructions on load mis-speculation. The method includes allocating new entries from a MEMFILE to store information necessary for instruction re-execution for each speculatively executed load instructions (hereinafter alternatively referred to as Load Recovery Metadata (LRM)) and instructions that either directly or indirectly consume data from the speculative load (hereinafter alternatively referred to as Dependent Recovery Metadata (DRM)). In an embodiment, MEMFILE is an abstracted data structure with data-keeping functionality and may not be a real memory. Physically, MEMFILE may be a hardware storage unit such as registers, internal buffers, scratchpads etc. Virtually, it may be a software data structure with data-keeping functionalities. LRM and DRM are the actual data that are stored in the MEMFILE.

Further, a new entry from a MAPFILE for each speculatively executed load instruction is allocated to store load dependency data (LDD). The MAPFILE entry stores indexes of MEMFILE entries/both the LRM of the speculative load and a set of DRM lookup information for all instructions either directly or indirectly consuming data from the speculatively executed load. A DRM includes an information for instruction re-execution for a speculative load dependent instruction. When a speculatively executed load instruction reaches a commit stage, the MAPFILE/LDD entry is examined, and all associated MEMFILE entries i.e., LRM and the set of DRM are iterated. If mis-speculation occurs, information pre-stored in these associated MEMFILE/the set of DRM entries are used for instruction re-execution directly, without affecting independent instructions after the mis-speculated load.

Figure 1B:
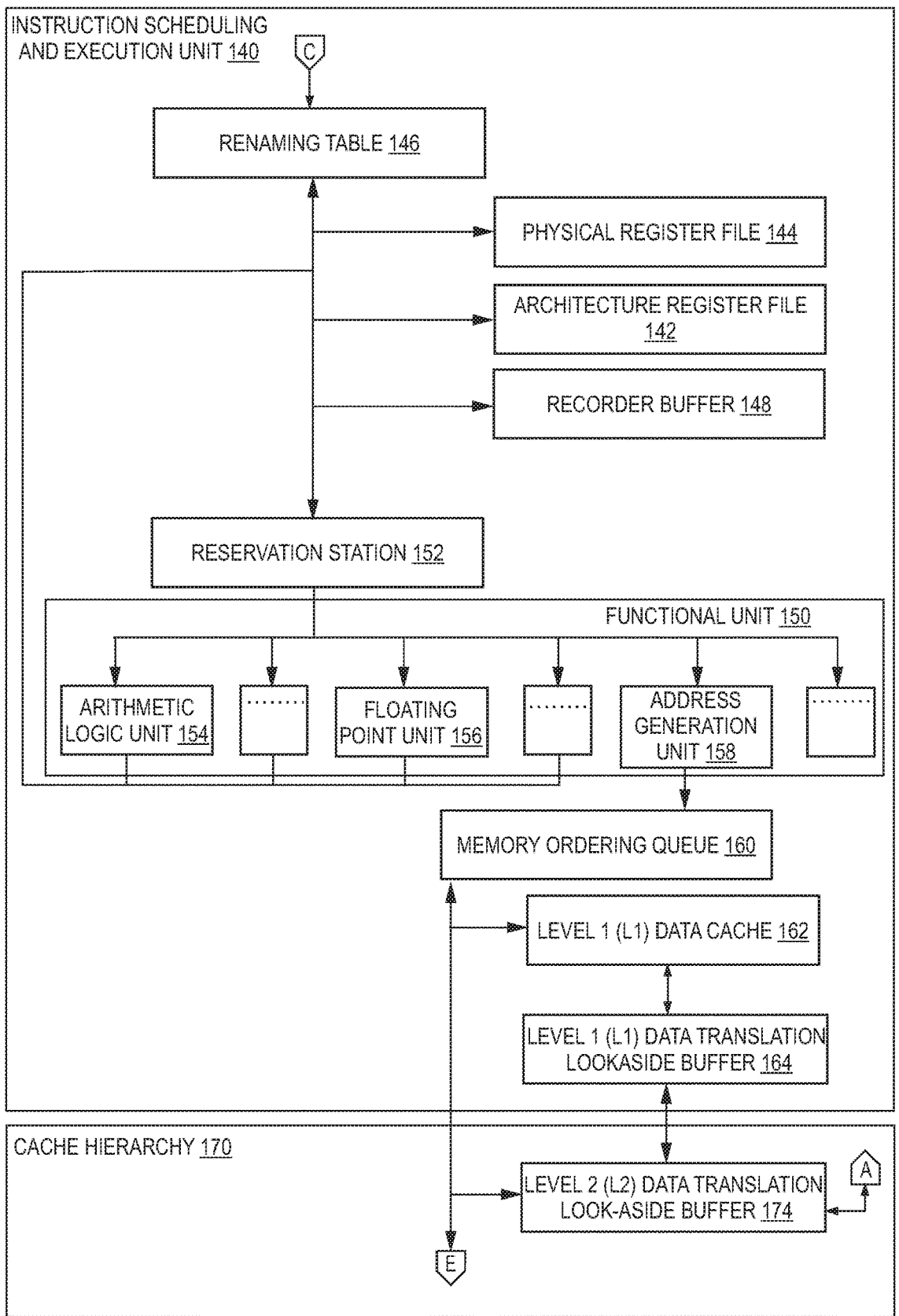
Figure 1C:
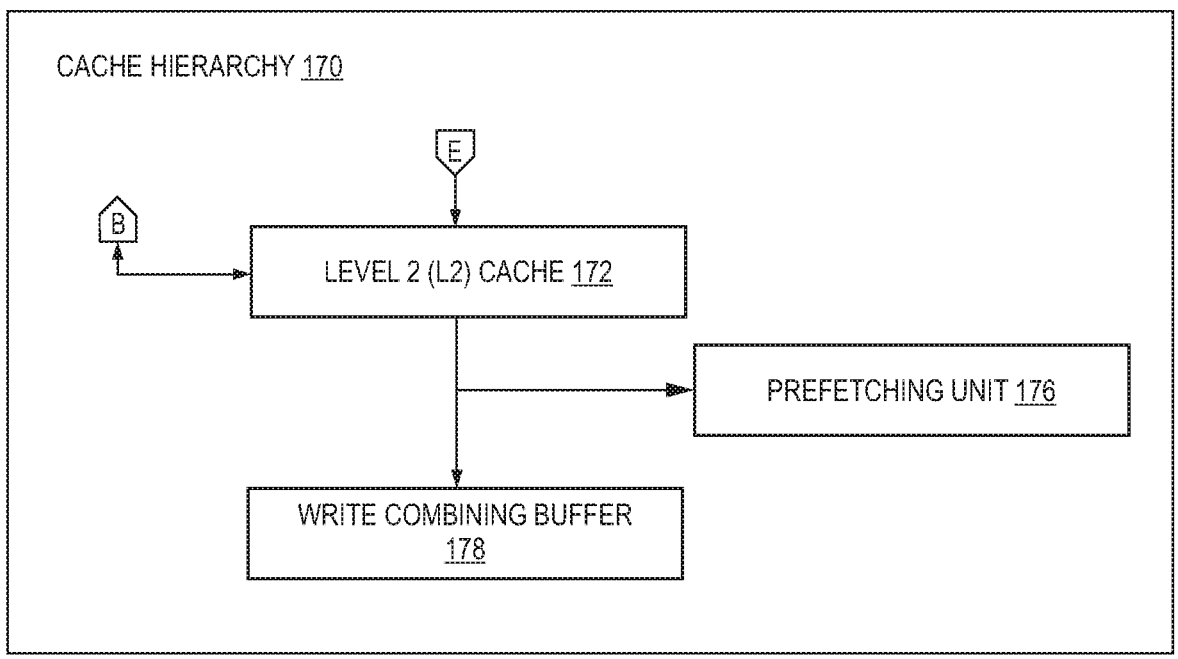

FIGS. 1A, 1B and 1C illustrate an exemplary representation of a processor 100 related to at least some example embodiments of the present disclosure. The apparatus such as a computing system (not shown) may be built on top of the processor 100 of FIGS. 1A to 1C. The examples of the computing system include a portable device, a cellphone, a game console, a tablet computer, a laptop computer, a desktop computer, a server, a workstation, a domain-specific embedded system, a computer-based simulator and the like. The processor 100 includes an instruction fetch unit 110 to read instruction data from a memory, an instruction decode unit 130 to decode instruction data provided by the instruction fetch unit 110, an instruction scheduling and execution unit 140 to support out-of-order execution (i.e., later instructions executed before earlier instructions) with in-order commit, and a cache hierarchy 170 to effectively optimize memory access latency.

The instruction fetch unit 110 includes a small Level 1 (L1) instruction cache 112, an instruction Translation Lookaside Buffer (TLB) 114, a Branch Target Buffer (BTB) 116, a Program Counter (PC) selection logic 118 and an instruction pre-decode buffer 120. The L1 instruction cache 112 stores commonly used instruction data in order to reduce memory access latency. The instruction TLB 114 is used to translate logical addresses into physical addresses during L1 instruction cache read. The BTB 116 is used for initial branches handling. More particularly, the BTB 116 is queried to predict whether a current instruction is a branch. If the current instruction is predicted as a branch, the predicted target address of the branch is read from the BTB 116 and used to update PC selection logic 118.

The PC selection logic 118 selects a source of a next program counter. More particularly, the PC selection logic 118 selects the source of a logical address for a next valid instruction and issues a read to the L1 instruction cache 112. The L1 instruction cache 112 translates the logical address into a physical address by querying the L1 instruction TLB 114 and uses the physical address to check a hit or a miss status of the request. In case of an L1 cache hit, instruction data is returned directly to the instruction pre-decode buffer 120. The instruction pre-decode buffer 120 serves as a temporary storage to decouple instruction fetch latency and instruction decode latency.

The instruction decode unit 130 reads/receives input from instruction pre-decode buffer 120. The instruction decode unit 130 includes a branch predictor 132, an instruction decoding logic 134 and an instruction post-decode buffer 136. The instruction decode unit 130 is responsible for decoding the instructions, predicting the outcome of any branch instructions and sending decoded instruction data to the instruction post-decode buffer 136. The instruction decoding logic 134 unpacks instruction binary into a set of control signals with data operands. The instruction decoding logic 134 further reads its input from instruction pre-decode buffer 120, decodes current instruction, and interacts with a more sophisticated branch predictor 132 if the current instruction is decoded as a branch. The branch predictor 132 predicts the outcome of branch instructions. Based on the outcome of the BTB 116 and the branch predictor 132, the PC selection logic 118 may be updated again. The instruction post-decode buffer 136 connects to the instruction scheduling and execution unit 140 and stores the decoded instruction data. The stored decoded instructions are read by the instruction scheduling and execution unit 140.

The instruction scheduling and execution unit 140/the instruction issuing unit 140 (hereinafter alternatively referred to as the unit 140) handle all complexities of out of order execution. The unit 140 reads decoded information from the instruction post-decode buffer 136 and speculatively executes out of order instructions to boost processor performance. The unit 140 further commits instructions in program order to ensure precise exception handling and correct program semantics. The unit 140 includes an architecture register file 142 to store final results of registers and a physical register file 144 to temporarily keep speculative results generated in out of order execution. The unit 140 further includes a renaming table 146 for keeping track of mappings between the architecture register file 142 and the physical register file 144. A reorder buffer 148 of the unit 140 commits out of order executed instructions in program order to support precise handling of any fault or exception. The unit 140 also includes a functional unit 150 for instruction execution and a reservation station 152 to track data availability.

The functional unit 150 further includes one or more (ALUs) 154 to perform arithmetic calculations, one or more Floating Point Units (FPUs) 156 to perform floating point operations, and one or more Address Generation Units (AGUs) 158 to compute valid addresses for memory instructions. The AGUs 158 is communicatively connected to a memory ordering queue 160. The memory ordering queue 160 is further connected to a small level 1 (L1) data cache 162 and L1 data TLB 164 for processing memory operations.

Based on the decoded instruction data, the unit 140 allocates needed resources such as the renaming table 146, the reservation station 152 and the reorder buffer 148. If any of these resources are unavailable, processing halts immediately and the instruction post-decode buffer 136 read is stalled until all resources become available again. If resources are allocated successfully, the decoded information of the instruction is used to update the renaming table 146, the reorder buffer 148 and finally pushed into the reservation station 152. Valid instruction source is read from the architecture register file 142, the physical register file 144 or the reorder buffer 148 and pushed into the reservation station 152 with decoded instruction information. Invalid instruction sources are tracked by the reservation station 152. The reservation station 152 actively monitors the outputs of the functional unit 150 and updates its entry once it finds a match of a physical register id that an instruction source is waiting for. Meanwhile, instructions with all source ready are arbitrated and sent to available and applicable units of the functional unit 150 for execution. Final results and flags generated during the execution are broadcasted to update the physical register file 144, the renaming table 146, the reorder buffer 148 and the reservation station 152. Load and store instructions have their address computed by the AGUs 158, then forwarded to the memory ordering queue 160. The memory ordering queue 160 interacts with the L1 data TLB 164 for address translation and L1 data cache 162 for load and store operations.

In an example embodiment, the cache hierarchy 170 is included in the processor 100 to serve misses from the L1 instruction cache 112 and L1 data cache 162 with the goal of optimizing memory access time. The multi-level cache hierarchy 170 includes a (larger but slower) Level 2 (L2) cache 172 to serve L1 instruction and data miss requests, a unified L2 TLB 174 to serve L1 instruction and data TLB miss requests, a prefetching unit 176 to intelligently predict and prefetch data that is likely to be accessed in a near term and a write combining buffer 178 to combine multiple write requests into one for optimizing memory bandwidth usage.

In an example embodiment, if the L1 instruction TLB 114 does not contain the mapping of the current instruction address, it issues a miss request to the L2 TLB 174 to query the mapping. The L1 instruction cache 112 translates the logical address into a physical address by querying the L1 instruction TLB 114 and uses the physical address to check hit or miss status of the request. In case of an L1 cache hit, instruction data is returned directly to the instruction pre-decode buffer 120. Otherwise, a miss request is sent to the L2 cache 172. If the L2 cache 172 hits, data is provided to the L1 instruction cache 112 or the L1 data cache 162. If the L2 cache 172 misses, a read request is generated to lower cache hierarchies or memory systems. Similar to the L2 cache 172, the L2 TLB 174 is used as a secondary buffer for the L1 data TLB 164 and the L1 instruction TLB 114. The prefetching unit 176 is used to optimize memory access time via predicting next accessed memory addresses based on historical memory access patterns and fetch data from those predicted addresses in advance. The write combining buffer 178 is used for optimizing memory bandwidth usage.

In existing (conventional) mis-speculated execution recovery methods (i.e., not in accordance with the present disclosure), the speculatively executed instructions are squashed and the execution is recovered. This process is done by returning the processor to a valid state it had before execution of the speculative instructions so that the correct instructions can be executed. This squashing process is facilitated by buffering all stores or writes performed by the speculatively executed instructions (which may then be erased in the event of mis-speculation) and flushing the mis-speculated executions from the pipeline. The squashing process may rely upon a checkpoint created at the beginning of the speculation which records the state of the processor in terms of its registers, load store queue, renaming table, etc. so that in the event of mis-speculation the speculatively executed instructions may be re-executed as if for the first time. This approach is time consuming because of repetitive re-execution of unaffected instructions and therefore, more power consuming In contrast to existing recovery methods, the embodiments of the present disclosure provide a more efficient solution by allocating entries from a MEMFILE to store necessary information for instruction re-execution for each speculatively executed load instruction and its associated instruction streams. Using this solution, all the independent instruction data remain unaffected, therefore re-execution of those instructions is saved. Some non-exhaustive example embodiments of mis-speculative execution recovery are described with reference to the following description, particularly with reference to FIGS. 2 to 12.

Figure 2:
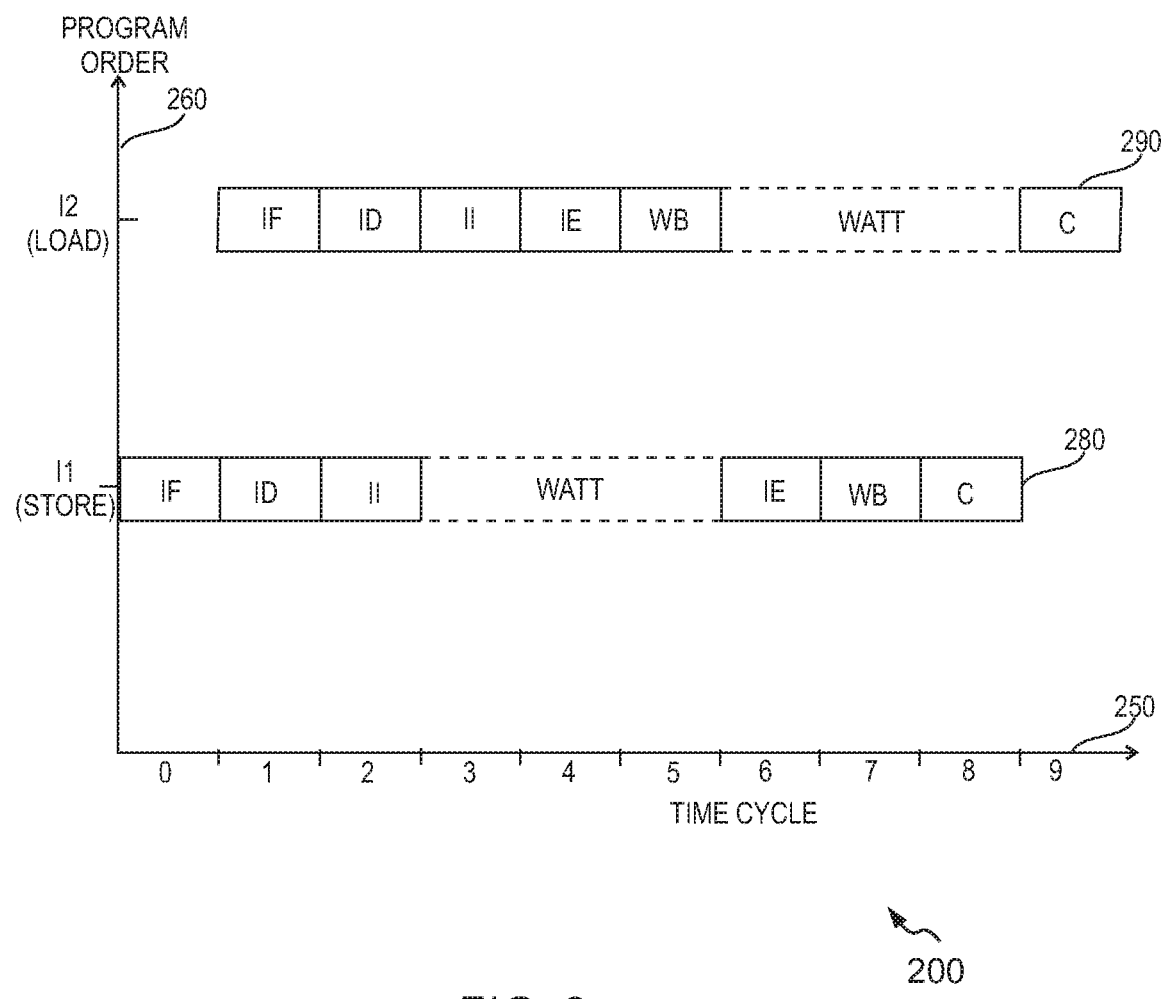
FIG. 2 represents a simplified representation of a memory mis-speculation in a pipeline architecture of a processor, in accordance with an example embodiment.

FIG. 2 represents a simplified representation 200 of a memory mis-speculation in a pipeline architecture of a processor (e.g., the processor 100 in FIGS. 1A-1C), in accordance with an example embodiment. More specifically, the representation 200 displays an instruction processing graph of a time cycle 250 versus a program order 260 of instructions I1 (store) and I2 (load) at different execution stages in the pipeline architecture. An execution sequence 280 belongs to I1 and an execution sequence 290 belongs to I2. Instruction processing is categorized by a plurality of stages such as, but not limited to, an Instruction Fetch (IF), an Instruction Decode (ID), an Instruction Issue (II), an Instruction Execute (IE), an instruction Write Back (WB), and an instruction Commit (C). The execution sequences 280 and 290 represent abbreviated execution stages of the instructions I1 and I2 respectively in the representation 200.

In the instruction fetch stage, a next instruction is read from the L1 instruction cache 112 and gets decoded at the instruction decode stage using the instruction decoding unit 130. At time cycle '0', I1 is fetched and at time cycle '1', I2 is fetched. I1 is decoded at time cycle '1' and I2 is decoded at time cycle '2'. Instruction issue is the stage where out of order scheduling happens. In this stage, instructions are selected based on a resource availability. As shown, I1 is at instruction issue stage at time cycle '3' and waiting for the resource availability. In such cases, a younger instruction i.e., I2 with all its resources available gets executed before an older instruction i.e., I1 that is waiting for its resource to be ready. Instruction execute stage is where the actual instruction execution happens. Instruction write back stage broadcasts the results generated by the functional unit 150 back to all structures waiting for the instruction results, such as the physical register file 144, the reservation station 152, the reorder buffer 148 etc. As shown, I2 is in the write back stage at time cycle '5' and I1 is in the 'WAIT' period at time cycle '5'.

I2 loads data at the execution stage at time cycle '4'. At this stage, the store address for I1 is not known as I1 is still in the 'WAIT' period. I2 loads the data irrespective of knowing the store address being ahead of I1 in terms of processing. Therefore, I2 is considered as a speculative load.

Once the resources get available for I1, its execution starts at a time cycle '6'. Instruction commit is a stage where in order program semantics are maintained for out of order executed instructions. In an embodiment, the instruction commit is handled by the reorder buffer 148. The completion status of each reorder buffer entry is checked in program order 260. If completion status is without any faults, interrupts or exceptions, the instruction writes the final result from the physical register file 144 into the architecture register file 142. The renaming table 146 is updated to indicate that architecture register file 142 has the most up to date data. As shown the I1 is at commit stage on time cycle '8'. Further, as per the program order 260, I2 is after I1. Therefore, I2 has to 'WAIT' after the write back stage to reach the commit stage. Accordingly, I2 is shown to be at the commit stage on time cycle '9'.

If the completion status at the commit stage indicates a valid fault, exception or interrupt event, additional handling needs to be done based on a specific event type. When the older store i.e., I1 reaches at the commit stage, it stores the data at the same address where I2 loaded the data in the memory. As the loading of data by I2 happened (i.e., execution stage of I2 at time cycle '4') before I1 storing the data at the memory address (i.e., commit stage of I1 at time cycle '8') to be loaded from by I2, I2 ends up reading a stale data. This is an example of the mis-speculation detected in the commit stage. Since mis-speculation is detected in the commit stage, it is triggered by the oldest instruction in program order (i.e., I1 in this case). Thus, all instructions before the current mis-speculated instruction must have final results saved in the architecture register file 142. A load-store violation is detected, and an error is logged in the load's (I2's) Reorder Buffer entry at time cycle '8'. When I2 reaches the commit stage at time cycle '9', an error is flagged, and the recovery mechanism is initiated. A recovery mechanism in accordance with an example embodiment of the present disclosure is explained hereinafter in detail with reference to FIG. 3.

Figure 3:
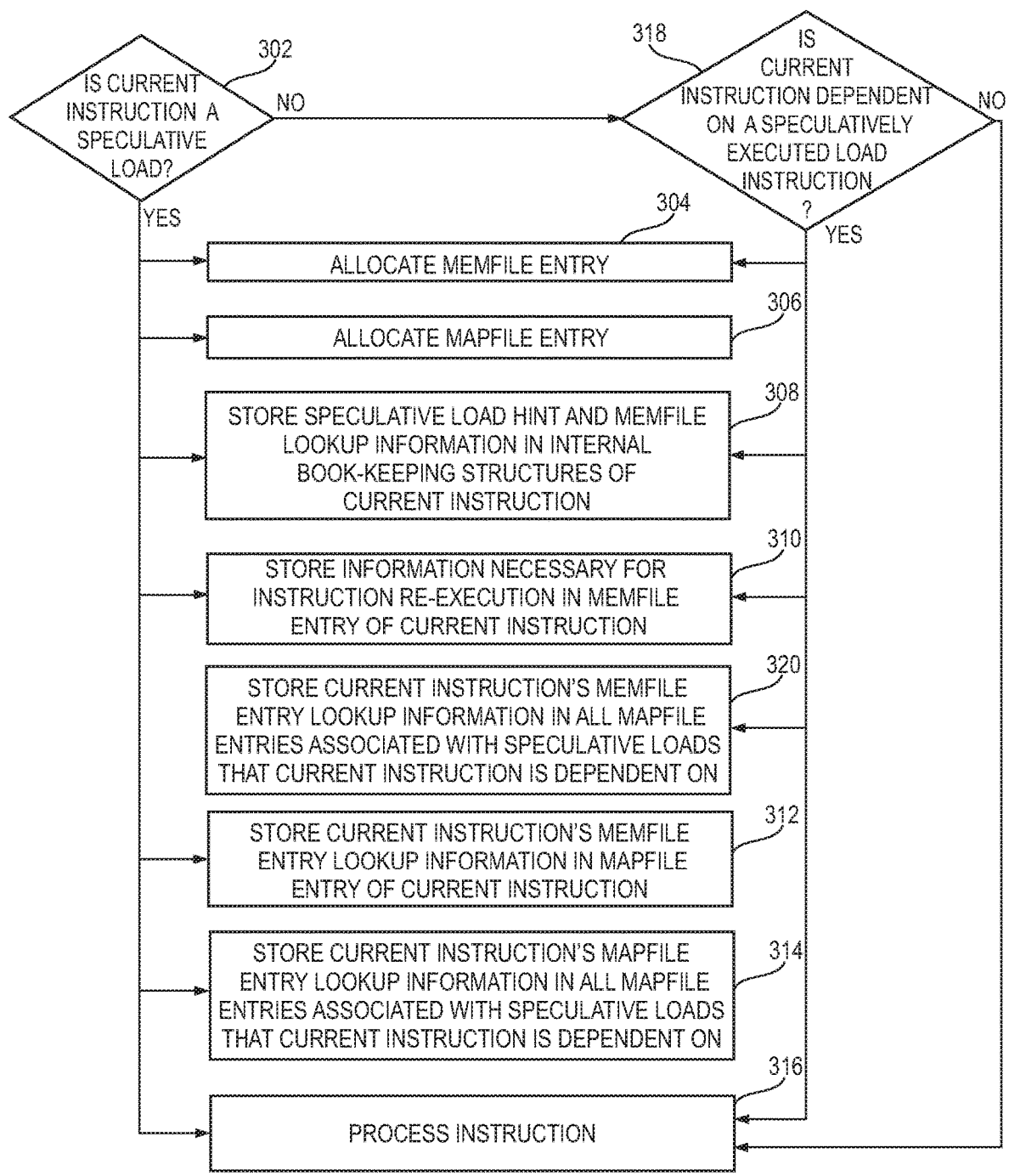
FIG. 3 represents a flow diagram of a method for facilitating a memory mis-speculation recovery for a speculative load and a set of speculative load dependent instructions, in accordance with an example embodiment.

FIG. 3 represents a flow diagram of a method 300 for facilitating a memory mis-speculation recovery for a speculative load and a set of speculative load dependent instructions, in accordance with an example embodiment. The method 300 depicted in the flow diagram may be executed by, for example, an apparatus or a system or a processor such as the processor 100. The Operations of the flow diagram 300, and combinations of operation in the flow diagram 300, may be implemented by, for example, hardware, hardware simulator, firmware, a processor, circuitry and/or a different device associated with the execution of software that includes one or more computer program instructions. The method 300 starts at operation 302.

At 302, a check is applied to determine whether a current instruction is a load instruction when an instruction gets prepared for speculative execution. The check is applied on an instruction being a current instruction from a set of instructions in a program flow of a processor architecture. As explained with reference to FIG. 2, I2 is a speculative load instruction reading a stale data from the memory address where I1 is yet to store the data to be loaded from by I2.

If it is determined that the current instruction is a speculative load, at 304, a MEMFILE entry (an example of a centralized recovery metadata structure) is allocated to store a Load Recovery Metadata (LRM). Each MEMFILE entry stores the recovery metadata for an instruction. The terms 'MEMFILE' and 'recovery metadata' are used interchangeably hereinafter without deviating from the scope of the disclosure. For the simplicity of the figures, the recovery metadata is mentioned as 'MEMFILE' in some figures without deviating from the scope of the disclosure. The recovery metadata of the speculative load is also alternatively referred to as a Load Recovery Metadata (LRM) hereinafter.

At 306, a MAPFILE entry (an example of a centralized dependency data structure) is allocated to store load dependency data (LDD) which contains lookup information of LRM and its associated DRMs. The terms 'MAPFILE' and 'dependency data' are used interchangeably hereinafter without deviating from the scope of the invention. In an embodiment, MAPFILE is a centralized data structure used for data-keeping. It may be implemented as a memory unit in hardware, or storage data structure in software. The data stored the MAPFILE include LDD (i.e., the dependency information of speculative load (LRM) and associated load-dependent instructions (DRM). Alternatively, the LDD itself may be allocated at a memory location to store lookup information of LRM and DRMs. For the simplicity of the figures, the dependency data is mentioned as 'MAPFILE' in some figures without deviating from the scope of the disclosure. The dependency data of the speculative load is also alternatively referred to as a Load Dependency Data (LDD) hereinafter.

At 308, a speculative load hint and a load recovery metadata (LRM) lookup information are stored in an internal book-keeping structure of the current instruction. A speculative load hint indicates that current instruction is a speculative load or a current instruction depends on a speculative load. Examples of the internal book-keeping structure of an instruction include, but is not limited to, entries of the renaming table 146, the reorder buffer 148, the physical register file 144 and the like.

At 310, information for instruction re-execution i.e., the LRM of current instruction is stored in MEMFILE entry allocated at step 304.

At 312, the lookup formation of the LRM is stored in MAPFILE entry allocated at 306 to construct the load dependency data (LDD) of the current instruction. In an embodiment, LDD is constructed at runtime. Initially LDD is empty, and starting from the speculative load, each instruction (the speculative load and all instructions depending on the speculative load) adds their LRMs or DRMs as part of LDD. Therefore, LDD always reflects the most current dependency information between LRM and all its associated DRMs.

At 314, the lookup information of load dependency data (LDD) of the current instruction is stored in all load dependency data (e.g., each Speculative Load Dependency Data (SLDD) of a set of SLDD associated with each speculative load of a set of speculative loads) associated with the speculative loads that the current instruction is dependent on. This lookup information is used to update MAPFILE entries of all load dependency data associated with the speculative loads that the current instruction is dependent on. This is a scenario when the current speculative load instruction has its source data either directly or indirectly returned by another speculatively executed load. Thereafter, at 316 the instruction is processed normally.

As an example, when a speculative load is first detected at step 302, a new MAPFILE entry is allocated at step 306 to store the LDD of current speculative load. Then lookup information of LRM of current load is stored in the newly allocated MAPFILE entry as a part of LDD at step 312. At this point, there are no other instructions consuming data from current speculative load, thus LDD of current load only has a single member, which is the LRM of itself. Meanwhile, this speculative load may consume data from other speculative loads, so lookup information of LDD of current load may be added to LDDs of other speculative loads it consumes data from at step 314. This effectively builds up a dependency chain among the speculative loads it consumes data from, current speculative load itself and all future instructions that is dependent on current speculative load.

If it is determined that the current instruction is not a speculative load at step 302, at 318, a check is applied to determine if the current instruction is dependent on a speculatively executed load instruction.

If it is determined that the current instruction consumes data directly or indirectly from the speculative load i.e., a set of speculative load dependent instructions are detected, the set including zero or more speculative load dependent instructions, the steps 304, 308, and 310 are followed. The recovery metadata of the speculative load dependent instruction is also alternatively referred to as a Dependent Recovery Metadata (DRM) hereinafter. For a detected set of speculative load dependent instructions a corresponding set of DRM is created. A DRM includes information for instruction re-execution for a speculative load dependent instruction.

Further, at 320, the dependent recovery metadata (DRM) entry lookup information of the current instruction is stored in and used to update all load dependency data (LDD) entries associated with the speculative loads the current instruction is dependent on. In other words, the LDD includes an information of the LRM and an information of the set of DRM. In this way, the MEMFILE entries of all instructions that are dependent on a speculative load can be looked up using load dependency data (LDD) stored in MAPFILE entry of that speculative load. Thereafter, at 316 the instruction is processed normally. However, if it is determined that the current instruction is not dependent on the speculative load at all, the instruction is processed normally at 316 as explained with reference to FIGS. 1A-1C. The method ends at step 316.

In an embodiment, after the storing of the relevant recovery metadata and the dependency data entries at a MEMFILE and a MAPFILE, the instruction is processed normally. Alternatively, the relevant recovery metadata and the dependency data may be stored at various memory locations in a non-contiguous manner A next instruction is checked to determine if it is a speculative load. As explained hereinabove, MAPFILE entry allocated for each speculative load instruction tracks all instructions that either directly or indirectly consume data of the speculative load. If mis-speculation is detected for a speculative load in the commit stage as explained with reference to FIG. 2, instead of discarding all the instructions after the mis-speculated load and redirecting the control flow, only the affected instructions are precisely identified using load dependency data (LDD) stored in the MAPFILE. Further, the corresponding mis-speculated results are corrected after re-execution of those instructions using load recovery metadata (LRM) and dependent recovery metadata (DRMs). In other words, the LDD is utilized to fetch the information of the LRM and the information of the set of DRM for re-execution purposes.

Figure 4:
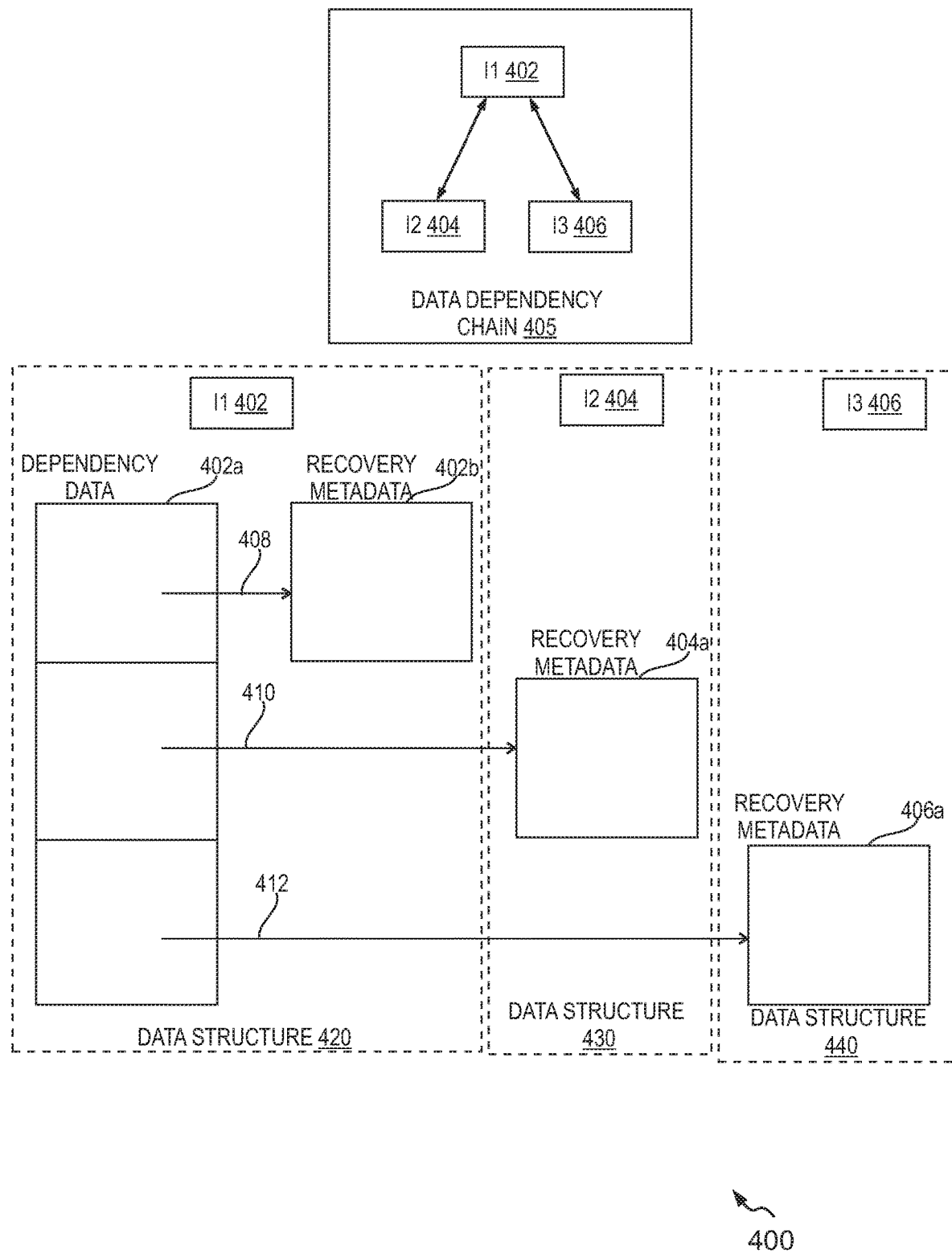
FIG. 4 represents a simplified representation of a relationship between a dependency data and a plurality of recovery metadata, in accordance with an example embodiment.

FIG. 4 represents a simplified representation 400 of a relationship between a dependency data and a plurality of recovery metadata, in accordance with an example embodiment of the disclosure. A data dependency chain 405 of exemplary instructions I1 402, I2 404 and I3 406 is shown. Execution of I2 404 and I3 406 depend on the results of the instruction I1 402. The representation 400 also includes a plurality of data structures corresponding to each instruction. For example, a data structure 420, a data structure 430 and a data structure 440 are shown.

Further, I1 402 is a speculative load in accordance with an example embodiment. As I1 402 is the speculative load, a MEMFILE entry/recovery metadata and a MAPFILE entry/dependency data are allocated to store load recovery metadata (LRM) and load dependency data (LDD) at respective memory locations (see, steps 304 and 306 of FIG. 3) in the processor 100 as shown in the data structure 420. I1 402 is shown to include entries of a dependency data 402a (i.e., LDD) and a recovery metadata 402b (i.e., LRM). The recovery metadata 402b includes information for instruction re-execution. (see, step 310 of FIG. 3)

I2 404 is shown to include entry of a recovery metadata 404a in the data structure 430 and I3 406 is shown to include a recovery metadata 406a in the data structure 440. As I2 404 and I3 406 are dependent on the speculative load I1 402, respective MEMFILES 404a (i.e., DRM) and 406a (i.e., DRM) are allocated at respective memory locations. (see, step 304 of FIG. 3). The dependency data 402a includes three valid recovery metadata lookup information of the instructions I1 402, I2 404 and I3 406. For example, an arrow 408 represents lookup information of the recovery metadata 402b as stored in a part of the dependency data 402a as I1 402 is a speculative load (see, step 312 of FIG. 3). An arrow 410 pointing to the recovery metadata 404a of I2 404 represents lookup information of the recovery metadata 404a as stored in the dependency data 402a as I2 404 is dependent on the speculative load I1 402 (see, step 320 of FIG. 3). Similarly, an arrow 412 represents the recovery metadata 406a entry lookup information as stored in the dependency data 402a as I3 406 is dependent on the speculative load I1 402 (see, step 320 of FIG. 3). Therefore, if a mis-speculation is detected for the speculative load I1 402 in the commit stage, all affected instructions i.e., I2 404 and I3 406 can be precisely identified using information stored in the dependency data 402a and corresponding mis-speculated results can be corrected after re-executing the instructions using the information stored in the associated recovery metadata/MEMFILE entries (e.g., the recovery metadata 402b, the recovery metadata 404a and the recovery metadata 406a).

In an alternate embodiment, the MEMFILE and the MAPFILE may be represented as centralized data structures for data keeping. Accordingly, the recovery metadata of instructions I1 402, I2 404 and I3 406 may be allocated as separate contiguous entries in a centralized MEMFILE/recovery metadata structure and the dependency data of I1 402 may be allocated as one or more contiguous entries in a centralized MAPFILE/dependency data structure.

Figure 5:
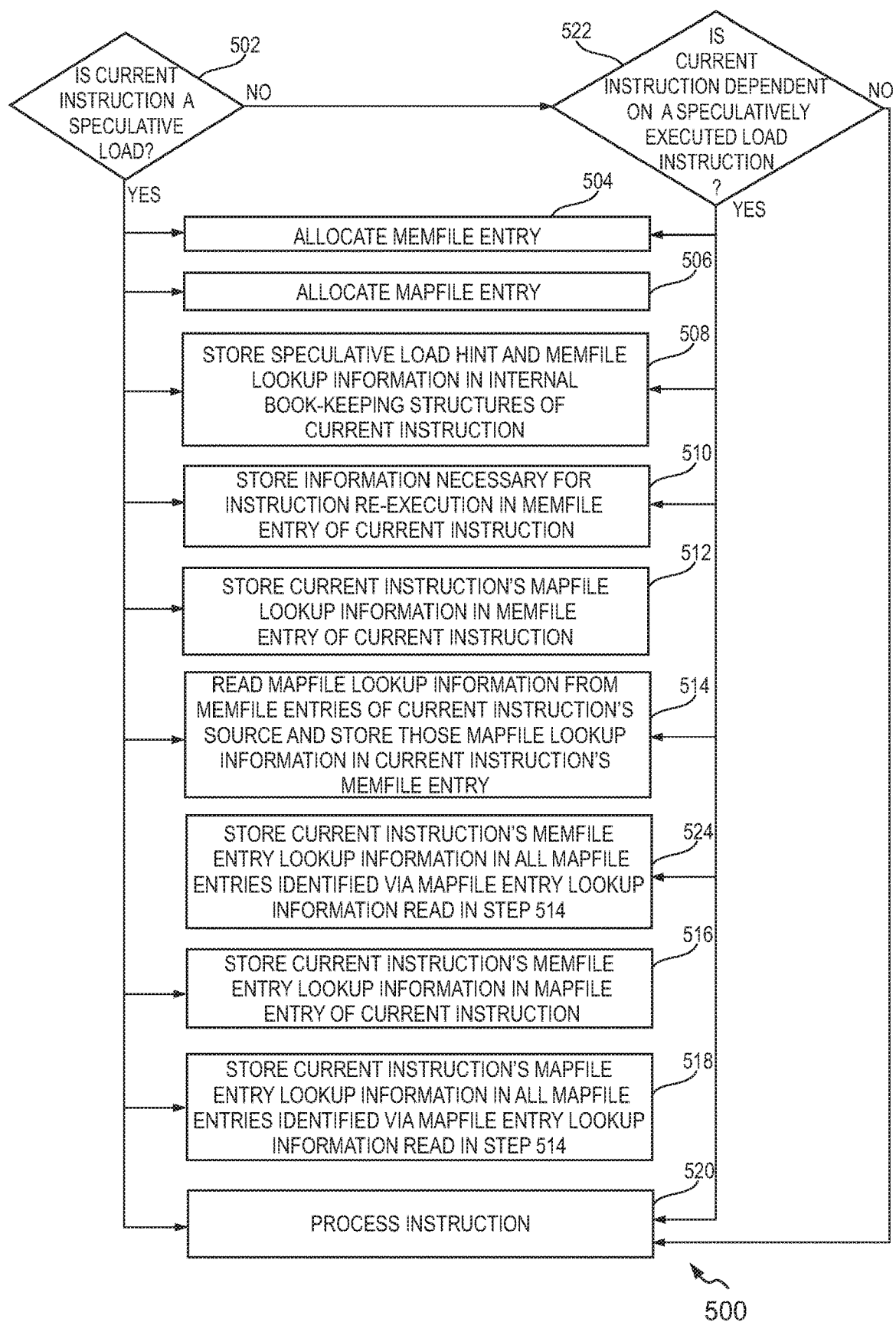
FIG. 5 represents a flow diagram of a method for facilitating a memory mis-speculation recovery for a set of multiple speculative load dependent instructions, in accordance with an example embodiment.

FIG. 5 represents a flow diagram of a method 500 for facilitating a memory mis-speculation recovery for a set of multiple speculative load dependent instructions, in accordance with an example embodiment. More specifically, the method 500 is applicable for the scenarios where one or more instructions are dependent on multiple speculative loads. For example, there is a program flow with four instructions: load instruction A and B, followed by multiply instruction C and D. Further, load A and load B are two speculative loads with dependency data entries 1, 2 allocated respectively. Multiply instruction C has one source coming from load A and another source coming from load B. Thus, according to the flow described in FIG. 3, the recovery metadata entry lookup information of instruction C will be stored in both dependency data entries 1 and 2. The instruction D has source only provided by instruction C. In order to find the right location to write recovery metadata entry lookup information of instruction D, all valid dependency data entries need to be searched to identify load dependency data (LDD) written entries used by instruction C, which are dependency data entries 1, 2 in this example.

A simpler and faster optimization approach for the above scenario is explained hereinafter. The recovery metadata entry of the load instruction A keeps its dependency data entry index 1. The recovery metadata entry of load instruction B keeps its dependency data entry index 2. Instruction C then reads recovery metadata entries of load instruction A and B and finds associated dependency entry indexes. Instruction C further stores its recovery metadata lookup information in dependency data entry 1, 2 and logs dependency data entry indexes 1, 2 in its MEMFILE entry. Thereafter, instruction D reads the recovery metadata entry of instruction C, finds dependency data entry 1, 2 are in use, stores its recovery metadata entry lookup information into dependency data in MAPFILE entry 1, 2 directly and logs MAPFILE entry 1, 2 in its recovery metadata. In this way, the exhaustive search of valid MAPFILE entries to find all dependency data written by an instruction's sources is simplified into a straightforward process.

The method 500 depicted in the flow diagram may be executed by, for example, an apparatus or a system, or the processor 100. The Operations of the flow diagram 500, and combinations of operation in the flow diagram 500, may be implemented by, for example, hardware, hardware simulator, firmware, a processor, circuitry and/or a different device associated with the execution of software that includes one or more computer program instructions. The method 500 starts at operation 502.

At 502, a check is applied to determine whether a current instruction is a load instruction when an instruction gets prepared for speculative execution. If it is determined that the current instruction is a speculative load, at 504, a recovery metadata/MEMFILE entry is allocated to store load recovery metadata (LRM) and lookup information of load dependency data (LDD). At 506, a MAPFILE entry/dependency data is allocated to store the LDD.

At 508, a speculative load hint and a recovery metadata lookup information are stored at an internal book-keeping structure of the current instruction. A speculative load hint indicates that current instruction is a speculative load or a current instruction depends on a speculative load. At 510, an information for instruction re-execution is stored in the recovery metadata entry of the current instruction.

At 512, the dependency data entry lookup information of the current instruction is stored in the recovery metadata entry of the current instruction.

At 514, dependency data entry lookup information of the current instruction's sources is read from MEMFILE/recovery metadata entries of current instruction's sources and stored in current instruction's MEMFILE entry.

At 516, the recovery metadata/MEMFILE entry lookup information of the current instruction is stored in and used to update the dependency data/MAPFILE entry of the current instruction.

At 518, dependency data entry lookup information of the current instruction is used to update all MAPFILE entries identified via the MAPFILE entry lookup information read in step 514. For example, for an instruction I1 being the speculative load, a lookup information of a dependency data of I1 is stored in one or more identified dependency data. The one or more identified dependency data are identified based on reading the lookup information of each dependency data of the one or more dependency data corresponding to each source of the one or more sources of I1 from each recovery metadata of the one or more recovery metadata corresponding each source of the one or more sources of I1. Thereafter, the instruction is processed normally at step 520 as explained with reference to FIGS. 1A-1C.

If it is determined that the current instruction is not a speculative load at step 502, at 522, a check is applied to determine if the current instruction is dependent on a speculatively executed load instruction. If it is determined that the current instruction consumes data directly or indirectly from the speculative load, the steps 504, 508, 510 and 514 are followed. As explained above, the instruction D reads the recovery metadata/MEMFILE entry of instruction C, finds dependency data in MAPFILE entry 1, 2 are in use and logs dependency data entry 1, 2 in its recovery metadata. However, if it is determined that the current instruction is not dependent on the speculative load at all, the instruction is processed normally at step 520.

Further, at 524, the recovery metadata lookup information of the current instruction is written in all dependency data identified via the MAPFILE entry lookup information read in step 514. For I1 being a speculative load dependent instruction from the set of speculative load dependent instructions, a lookup information of the recovery metadata of I1 is stored in one or more discovered dependency data. The one or more discovered dependency data are discovered based on reading the lookup information of each dependency data of the one or more dependency data corresponding to each source of the one or more sources of I1 from each recovery metadata of the one or more recovery metadata corresponding to each source of the one or more sources of I1. For example, after finding dependency data is in MAPFILE entry 1, 2, the instruction D stores its recovery metadata lookup information into dependency data in MAPFILE entry 1, 2 directly. The method ends at step 520. In an embodiment, after the storing of the relevant recovery metadata and the dependency data at various memory locations, the instruction is processed normally. A next instruction is checked to determine if it is a speculative load.

Figure 6:
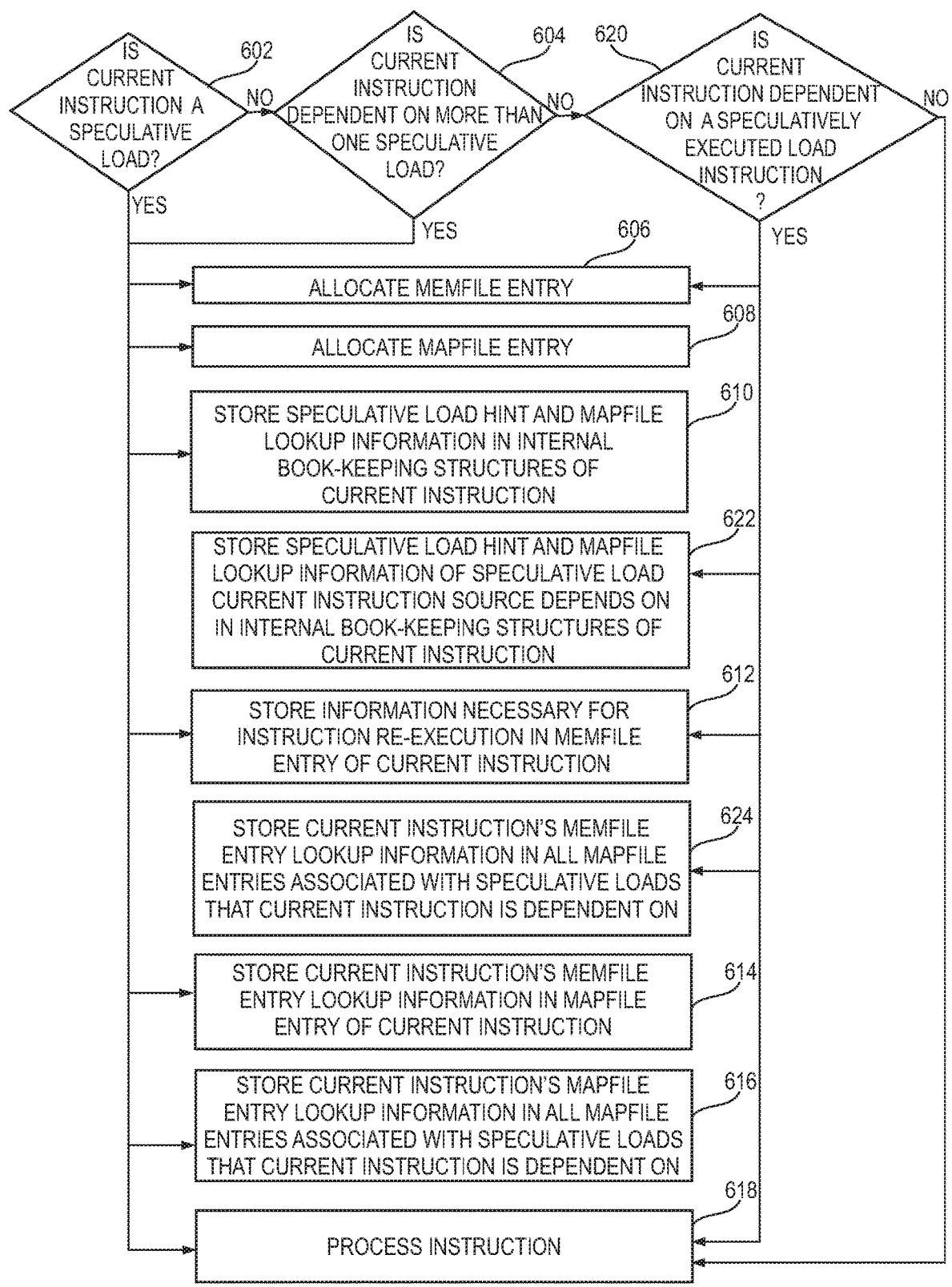
FIG. 6 represents a flow diagram of another method for facilitating a memory mis-speculation recovery for the set of multiple speculative load dependent instructions, in accordance with an example embodiment.

FIG. 6 represents a flow diagram of another method 600 for facilitating a mis-speculated recovery for the set of multiple speculative load dependent instructions, in accordance with an example embodiment. More specifically, method 600 is directed to address the inefficiencies about searching MAPFILE entries used by instructions that are dependent on multiple speculative loads. The method 600 depicted in the flow diagram may be executed by, for example, an apparatus or a system or the processor 100. The Operations of the flow diagram 600, and combinations of operation in the flow diagram 600, may be implemented by, for example, hardware, hardware simulator, firmware, a processor, circuitry and/or a different device associated with the execution of software that includes one or more computer program instructions. The method 600 starts at operation 602.

At 602, a check is applied to determine whether a current instruction is a load instruction when an instruction gets prepared for speculative execution. (e.g., step 302 of FIG. 3)

If it is determined that the current instruction is not a speculative load at 602, at 604, it is checked if a current instruction is dependent on more than one speculative load (hereinafter alternatively referred to as a set of multiple speculative load dependent instructions).

If it is determined that the current instruction is a speculative load at 602, or if it is determined that the current instruction is dependent on more than one speculative load at 604, a plurality of steps are followed as explained herein below. It is noted that the steps are followed individually for both the conditions as and when they are true. As the same steps are followed for both the conditions, a repetitive explanation is avoided.

At 606, a MEMFILE entry being a centralized recovery metadata structure is allocated to store recovery metadata. Alternatively, a MEMFILE entry is allocated to store recovery metadata at a memory location. The recovery metadata of an instruction from the set of multiple speculative load dependent instructions is alternatively referred to as Multi Load Recovery Metadata (MLRM).

At 608, a MAPFILE entry being a centralized dependency data structure/dependency data is allocated to store dependency data. Alternatively, a MAPFILE entry/dependency data is allocated to store dependency data at a memory allocation. The dependency data of an instruction from the set of multiple speculative load dependent instructions is alternatively referred to as Multi Load Dependency Data (MLDD).

At 610, a speculative load hint and a dependency data lookup information are stored in an internal book-keeping structure of the current instruction.

At 612, information for instruction re-execution/recovery metadata is stored in the MEMFILE entry of the current instruction. For example, the MLRM includes the information for instruction re-execution for an instruction from the set of multiple speculative load dependent instructions.

At 614, the recovery metadata lookup information of the current instruction is used to update the dependency data of the current instruction. For example, the MLDD includes the information of the MLRM.

At 616, the dependency data lookup information of the current instruction is stored in all dependency data/MAPFILE entries associated with the speculative loads that the current instruction is dependent on. For an instruction I2 from the set of multiple speculative load dependent instructions and if I2 is dependent on each speculative load of a set of speculative loads, a lookup information of the MLDD is stored in each Source Dependency Data (SDD) of a set of SDD. Each SDD of the set of SDD is associated with each speculative load of the set of speculative loads. Thereafter, the instruction is processed normally at 618 as explained with reference to FIG. 1.

If it is determined that the current instruction is not dependent on more than one speculative load at step 604, at 620, a check is applied to determine if the current instruction is dependent on a speculatively executed load instruction.

If it is determined that the current instruction consumes data directly or indirectly from the speculative load, the step 606 is followed. However, if it is determined that the current instruction is not dependent on the speculative load at all, the instruction is processed normally at 618.

Further, at 622, a speculative load hint and a dependency data lookup information of its dependent speculative load is stored in an internal book-keeping structure of the current instruction. Thereafter, step 612 is followed.

At 624, the recovery metadata lookup information of the current instruction is stored in all dependency data entries associated with the speculative loads the current instruction is dependent on. The recovery metadata of the current instruction is also alternatively referred to as a Multi Dependent Recovery Metadata (MDRM) hereinafter, if the current instruction is dependent on a multiple speculative load dependent instruction. For an instruction that is dependent on a multiple speculative load dependent instruction a corresponding MDRM is created. An MDRM includes information for instruction re-execution for an instruction that is dependent on a multiple speculative load dependent instruction. The method ends at 618. In an embodiment, after the storing of the relevant recovery metadata into MAPFILE entries of corresponding dependency data, the instruction is processed normally. A next instruction is checked to determine if it is a speculative load.

The main difference between the flow of FIG. 3 and FIG. 6 is an explicit check added for instructions that are dependent on multiple speculative loads (see, step 604). If the check returns true, those instructions are treated as speculative loads, with MAPFILE entries allocated in addition to MEMFILE entries. Lookup information of MAPFILE entries for those instructions are stored into MAPFILE entries of its dependent speculative loads. Other instructions consuming data from those instructions, instead of searching entire MAPFILE to find the corresponding MAPFILE entries for MEMFILE entry insertion, MEMFILE entry of other instructions can simply be stored in the MAPFILE entry allocated for those instructions. Considering, the previous example of a program flow with four instructions with load instruction A and B, followed by multiply instruction C and D, a new MAPFILE entry is allocated for instruction C, e.g., entry 3. MEMFILE entry lookup information of instruction C is stored in the newly allocated MAPFILE entry 3. MAPFILE entry lookup information of instruction C is stored in MAPFILE entries of speculative loads that its sources are dependent on, which are MAPFILE entries 1 and 2. Then for instruction D, instead of searching MAPFILE to find all MAPFILE entries used by instruction C, (entries 1 and 2), it is possible to write MEMFILE entry lookup information of D into the MAPFILE entry allocated for instruction C (entry 3) as explained.

Moreover, since all speculative load instructions and instructions that are dependent on multiple speculative loads have MAPFILE entry allocated, MAPFILE entry lookup information can be used instead of MEMFILE entry lookup information to be stored in internal book-keeping structures. If the current instruction is a speculative load instruction or if the current instruction is dependent on multiple speculative loads, current instruction's MAPFILE entry lookup information is stored with the internal book-keeping structures. Instruction that only depends on a single speculative load, MAPFILE entry of that instruction's dependent speculative load is stored in the internal book-keeping structure of that instruction. This approach provides an easier way to identify the speculative loads and all renamed destination registers that either directly or indirectly consume data from the speculative loads. Thus, by allocating an independent entry in the MAPFILE for instructions that are dependent on multiple speculative loads, indirect dependency can be eliminated which allows for faster lookup on MEMFILE of each instruction.

Figure 7:
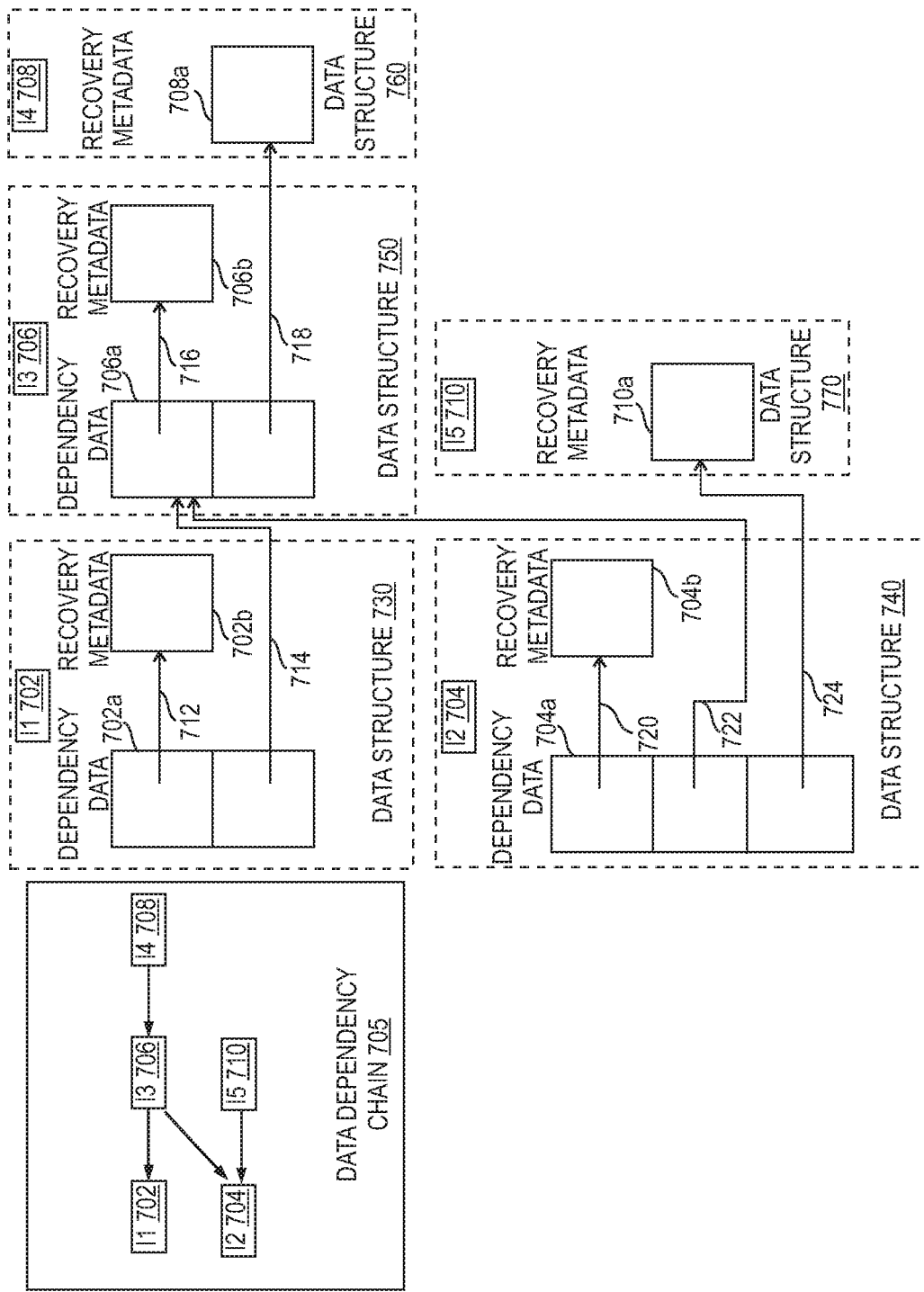
FIG. 7 represents a simplified representation of a relationship between a plurality of recovery metadata and a plurality of dependency data, in accordance with an example embodiment.

FIG. 7 represents a simplified representation 700 of a relationship between a plurality of recovery metadata and a plurality of dependency data, in accordance with an example embodiment. More specifically, the relationship is explained for the scenarios where instructions are dependent on a set of multiple speculative loads. A data dependency chain 705 of exemplary instructions I1 702, I2 704, I3 706, I4 708 and I5 710 is shown. Execution of I3 706 depends on the results of the instructions I1 702 and I2 704. Execution of I4 708 depends on the results of the instruction I3 706. Execution of I5 710 depends on the results of the instruction I2 704. Further, I1 702 and I2 704 are speculative loads in accordance with an example embodiment. The representation 700 also includes a plurality of data structures corresponding to each instruction. For example, a data structure 730, a data structure 740, a data structure 750, a data structure 760 and a data structure 770 are shown.

As I1 702 and I2 704 are speculative loads, a recovery metadata (LRM) and a dependency data (LDD) are allocated for each of them at memory locations (see, steps 606 and 608 of FIG. 6) in the processor 100. I1 702 is shown to include entries of a dependency data 702a and a recovery metadata 702b as shown in the data structure 730. I2 704 is shown to include entries of a dependency data 704a and a recovery metadata 704b as shown in the data structure 740. The recovery metadata 702b and 704b include information for instruction re-execution. (see, step 612 of FIG. 6)

As I3 706 is dependent on multiple speculative loads, a recovery metadata (MLRM) and a dependency data (MLDD) are allocated at respective memory locations (see, steps 604, 606 and 608 of FIG. 6) in the processor 100. I3 706 is shown to include entries of a dependency data 706a and a recovery metadata 706b as shown in the data structure 750. The recovery metadata 706b includes information for instruction re-execution.

As I4 708 and I5 710 are dependent on a single speculative load each, a corresponding recovery metadata is allocated at a memory location (see, step 608 of FIG. 6) in the processor 100. I4 708 is indirectly dependent on speculative loads I1 702 and I2 704. I5 710 is directly dependent on speculative load I2 704. I4 708 is shown to include entries of a recovery metadata 708a as shown in the data structure 760 and I5 710 is shown to include entries of a recovery metadata 710a as shown in the data structure 770. The recovery metadata 708a and 710a include information for instruction re-execution.

The dependency data 702a includes two parts each capable of storing various lookup information of the instructions I1 702 and I3 706. For example, an arrow 712 represents lookup information of the recovery metadata 702b entry as stored in a part of the dependency data 702a as I1 702 is a speculative load (see, step 614 of FIG. 6). An arrow 714 pointing to the dependency data 706a of I3 706 represents lookup information of the dependency data 706a entry as stored in the dependency data 702a as I3 706 is dependent on the speculative load I1 702 (see, step 616 of FIG. 6).

The dependency data 706a includes two parts each capable of storing various lookup information of the instructions I3 706 and I4 708. For example, an arrow 716 represents lookup information of the recovery metadata 706b entry as stored in a part of the dependency data 706a as I3 706 is dependent on multiple speculative loads. An arrow 718 pointing to the recovery metadata 708a of I4 708 represents lookup information of the recovery metadata 708a (MDRM) entry as stored in the dependency data 706a as I4 708 is dependent on I3 706 (see step 624 of FIG. 6).

The dependency data 704a includes three parts each capable of storing various lookup information of the instructions I2 704, I3 706 and I5 710. For example, an arrow 720 represents lookup information of the recovery metadata 704b entry as stored in a part of the dependency data 704a as I2 704 is a speculative load (see, step 614 of FIG. 6). An arrow 722 pointing to the dependency data 706a of I3 706 represents lookup information of the dependency data 706a entry as stored in the dependency data 704a as I3 706 is dependent on the speculative load I2 704 (see step 616 of FIG. 6). An arrow 724 pointing to the recovery metadata 710a of I5 710 represents lookup information of the recovery metadata 710a entry as stored in the dependency data 704a as I5 710 is dependent on the speculative load I2 (see step 624 of FIG. 6).

Further, as I3 706 is dependent on each speculative load of the set of speculative loads i.e., I1 702 and I2 704, a lookup information of the dependency data 706a (MLDD) is stored in each source dependency data (SDD) of a set of source dependency data (SDD). Each SDD of the set of SDD is associated with each speculative load of a set of speculative loads. This is represented by the arrows 714 and 722. The lookup information of dependency data (MLDD) 706a of I3 706 is stored in respective dependency data (an example of SDD) 702a and dependency data 704a (another example of SDD) of I1 702 and I2 704 as I3 706 is dependent on each speculative load of the set of speculative loads. It is noted that SDD and LDD are same for I1 702 and I2 704.

If a mis-speculation is detected for the speculative load I1 702 in the commit stage, all affected instructions i.e., I3 706 and I4 708 can be precisely identified using information stored in the dependency data 702a and 706a and corresponding mis-speculated results can be corrected after re-executing those instructions using the information stored in the associated recovery metadata entries (e.g., the recovery metadata 702b, the recovery metadata 706b and the recovery metadata 708a).

If a mis-speculation is detected for the speculative load I2 704 in the commit stage, all affected instructions i.e., I3 706, I4 708 and I5 710 can be precisely identified using information stored in the dependency data 704a and 706a and corresponding mis-speculated results can be corrected after re-executing those instructions using the information stored in the associated recovery metadata entries (e.g., the recovery metadata 704b, the recovery metadata 706b, the recovery metadata 708a and the recovery metadata 710a).

In an alternate embodiment, the MEMFILE and the MAPFILE may be represented as centralized data structures for data keeping. Accordingly, each LDD/MAPFILE entry may have a unified (encoded) information to track lookup information of all associated recovery metadata. The recovery metadata 702b, 704b, 706b 708a and 710a may be allocated as separate contiguous entries in a centralized MEMFILE/recovery metadata structure and the dependency data 702*a*, 704*a* and 706*a* may be allocated as one or more contiguous entries in a centralized MAPFILE/dependency data structure.

Figure 8A:
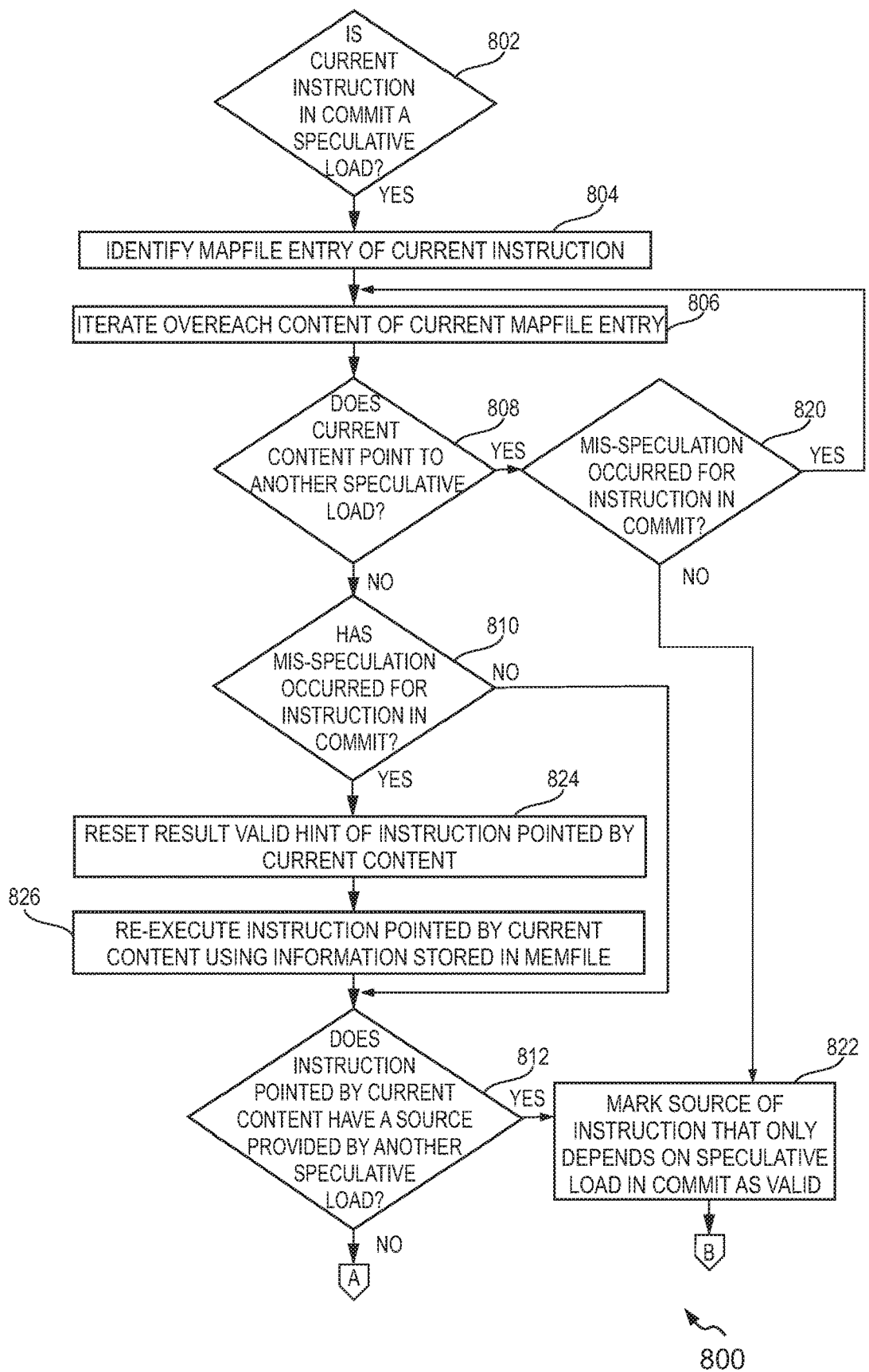
FIGS. 8A and 8B show a flow diagram of a method for facilitating a memory mis-speculation recovery in a commit stage, in accordance with an example embodiment.
Figure 8B:
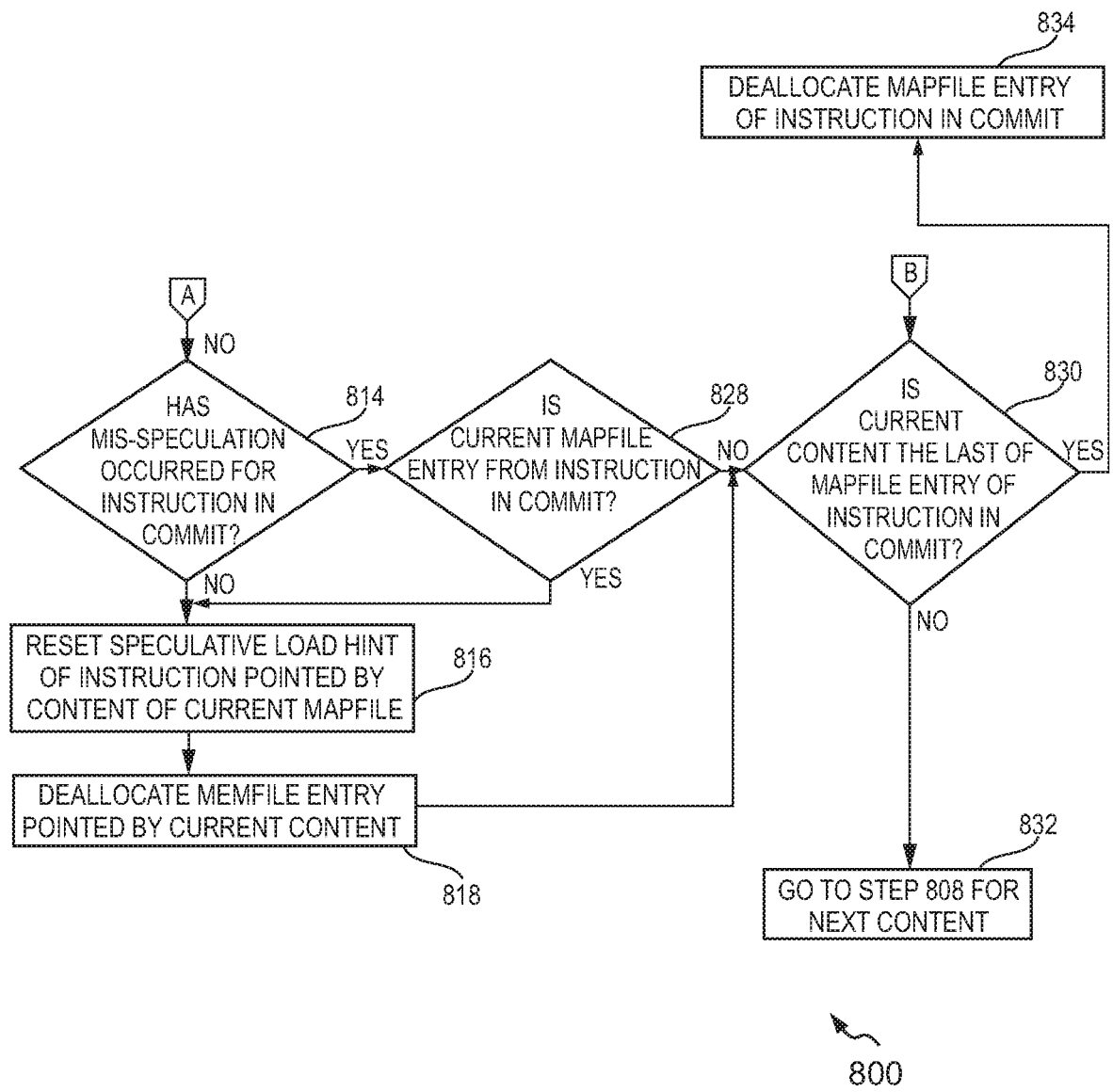

FIGS. 8A and 8B collectively show a flow diagram of a method 800 for facilitating a memory mis-speculation recovery in a commit stage, in accordance with an example embodiment. More specifically, the method 800 depicted in the flow diagram may be executed by, for example, an apparatus or a system operating on the processor 100. The Operations of the flow diagram 800, and combinations of operation in the flow diagram 800, may be implemented by, for example, hardware, hardware simulator, firmware, a processor, circuitry and/or a different device associated with the execution of software that includes one or more computer program instructions. The method 800 starts at operation 802.

At 802, it is checked whether the current instruction in the commit stage is a speculative load. In an embodiment, this is checked via looking at the speculative load hint stored in internal book-keeping structures, such as a renaming table, a reorder buffers and the like. If it is not a speculative load, current instruction is processed normally as explained with reference to FIG. 1.

If the current instruction is a speculative load instruction, at 804, the dependency data (LDD) entry of the current instruction is looked up. At 806, one or more contents of the dependency data entry is iterated.

At 808, it is determined whether current content points to another speculative load. If no, at 810, it is determined whether mis-speculation has occurred on the current instruction in commit stage.

If it is determined that the current content does not point to another speculative load and mis-speculation has not occurred on the current instruction in commit, at 812, a secondary check is applied to determine whether the instruction pointed by current content consumes data from another speculative load other than the speculative load instruction in the commit stage.

If the condition mentioned in step 812 returns false, at 814, it is determined whether mis-speculation has occurred on the current instruction in commit stage. If it is determined that mis-speculation has not occurred on the current instruction in commit stage, the result generated by instruction pointed by current content is correct. Therefore, at 816, a speculative load hint/flag for instruction pointed by content of current dependency data is reset. At 818, the associated recovery metadata entry (e.g., LRM and DRM) is deallocated. Alternatively, the MEMFILE entry (centralized recovery metadata structure) of associated recovery metadata (e.g., LRM and DRM) is deallocated.

If step 808 is true, at 820, it is determined whether mis-speculation has occurred on the current instruction in commit stage. If step 820 is false, at 822, current instruction's source that is provided only by the speculative load in commit is marked as valid. Also, if the condition mentioned in step 812 is true, at 822, current instruction's source that is provided only by the speculative load in commit is marked as valid. It is a scenario, where there is no mis-speculation on the speculative load in commit, but current contents either points to another speculative load or an instruction has its source provided not only by the speculative load in commit, but other speculative loads as well. In both the events, the current instruction's source that provided only by the speculative load in commit can be marked as valid, which is mentioned in step 822. Neither the final result can be marked as valid nor its MEMFILE entry can be deallocated in this case because other speculative loads consumed by current instruction could be mis-speculated.

If the condition mentioned in step 820 is true, i.e., the mis-speculation has occurred on the current instruction in commit stage, the flow is redirected to step 806 to start reading the content of the dependency data entry of another speculative load. If instruction pointed by the content of current dependency data has a source provided by another speculative load, even after re-execution, speculative load hint and recovery metadata entry cannot be cleared as the other speculative load may turn out to be mis-speculated in the commit stage. If instruction pointed by the content of current dependency data is another speculative load, not only itself needs to be re-executed, but all instructions either directly or indirectly consuming data from it need to be re-executed as well. Thus, all contents of its (another speculative load's) dependency data entry will also be iterated and re-executed. This is illustrated by a backward arrow from step 820 to step 806.

Further, if the condition mentioned in step 810 returns true, i.e., speculative load in commit is mis-speculated, at 824, the result valid hint in the internal book-keeping structures of the instruction pointed by the content of current dependency data entry is reset to 0.

At 826, the instruction pointed by the current content is re-executed using the information stored in the recovery metadata. It means that all the instructions either directly or indirectly consuming data from the mis-speculative load need to be re-executed with corrected load data.

At 814, if it is determined that the mis-speculation has occurred on the current instruction in commit stage, at 828, it is checked whether current dependency data entry is from the instruction in the commit stage. Current dependency data entry is checked against dependency data entry of speculative load in commit for a match. This equality check fails for all contents from dependency data entry of the speculative load detected in step 808. Therefore, after re-execution, all instructions pointed by contents from dependency data entry of another speculative load detected in step 808 cannot have their speculative load hint and MEMFILE entry cleared as the speculative load detected in step 808 may be mis-speculated as well.

If the content of current dependency data entry does not point to another speculative load (i.e., if the step 808 returns false) or an instruction with its source provided by another speculative load (i.e., the step 812 returns false), and the step 828 returns true, the re-executed result of instruction pointed by the content of current dependency data entry become valid. Both the speculative load hint and associated recovery metadata entry can be cleared after re-execution as illustrated in step 816 and 818.

Further, if the condition mentioned in step 828 is false i.e., current dependency data entry is not from the instruction in the commit stage, then at step 830 it is checked if the current content is last of dependency data entry of the instruction in the commit stage. If no, at, 832, the flow is directed back to the step 808 to check if a next content points to another speculative load. However, if at step 830 it is determined that the current content is last of dependency data entry of the instruction in the commit stage, at step 834, dependency data (e.g., LDD) entry of the instruction in the commit stage is deallocated/cleared. Alternatively, MAPFILE entry (centralized dependency data structure) associated with dependency data (e.g., LDD) of the instruction in the commit stage can be deallocated. Further, the flow proceeds to step 830 after executing the step 818. Also, the flow proceeds to step 830 after executing the step 822. The method ends at step 834.

After step 834, the processor checks for the next instruction in line waiting to enter the commit stage and the method 800 restarts.

An example below explains the method 800 in detail. There are four instructions in a program flow. Load instructions A and B followed by add instructions C, D. The load A is a speculative load. The load B is another speculative load with address computed using data returned by load A. In this case, MAPFILE lookup information of load B gets stored in MAPFILE entry of load A. Addition instruction C has source data provided by load B. Therefore, MEMFILE lookup information of instruction C is stored in MAPFILE entry of load B. Instruction D has source provided by load A. If load A gets detected as a mis-speculated load in the commit stage, all contents of its MAPFILE entry are iterated. This includes MEMFILE lookup information of load A itself, MAPFILE lookup information of load B and MEMFILE lookup information of instruction D. After re-execution with corrected data returned by re-executed load A, both the load A instruction itself and instruction D can be marked as non-speculative and corresponding MEMFILE entries can be deallocated. For load B, all contents of its MAPFILE entry also need to be iterated and re-executed. Load B itself and instruction C get found and are re-executed after iterating the MAPFILE entry of load B. After re-execution, the results of add instruction C may still be wrong as load B may be mis-speculated even with current source returned by re-executed load A. Thus, instruction C cannot mark its result as non-speculation or deallocate its MEMFILE entry after re-execution. The above flow repeats until the last content of a MAPFILE entry of speculative load in commit has been processed. If all contents from MAPFILE entry of speculative load in commit have been iterated, the MAPFILE entry itself can be deallocated and instruction commit logic proceeds to next instruction in program order. Otherwise, the next content of current MAPFILE entry is processed.

Figure 9A:
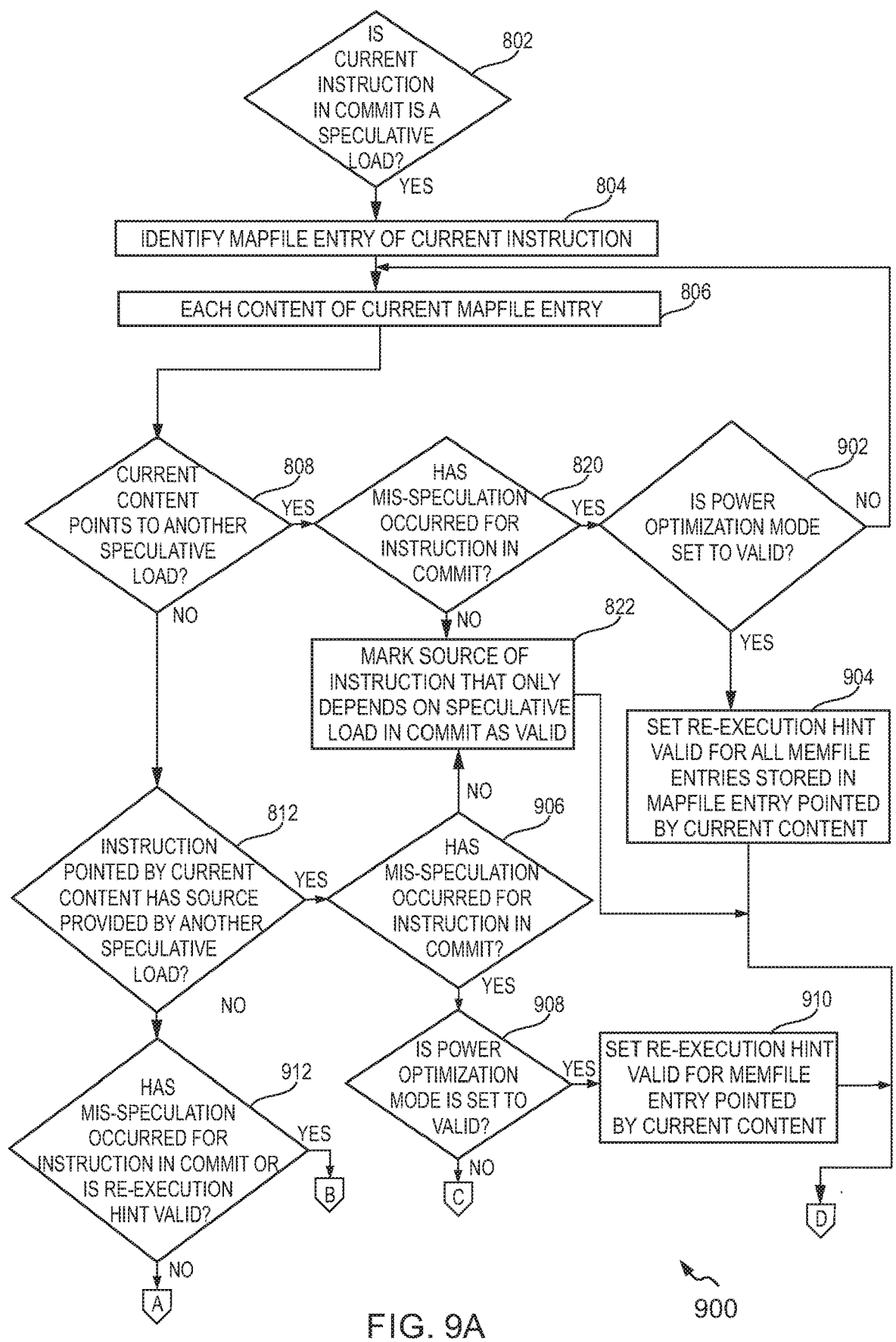
FIGS. 9A and 9B show a flow diagram of a method for facilitating a memory mis-speculation recovery in a commit stage, in accordance with another example embodiment.
Figure 9B:
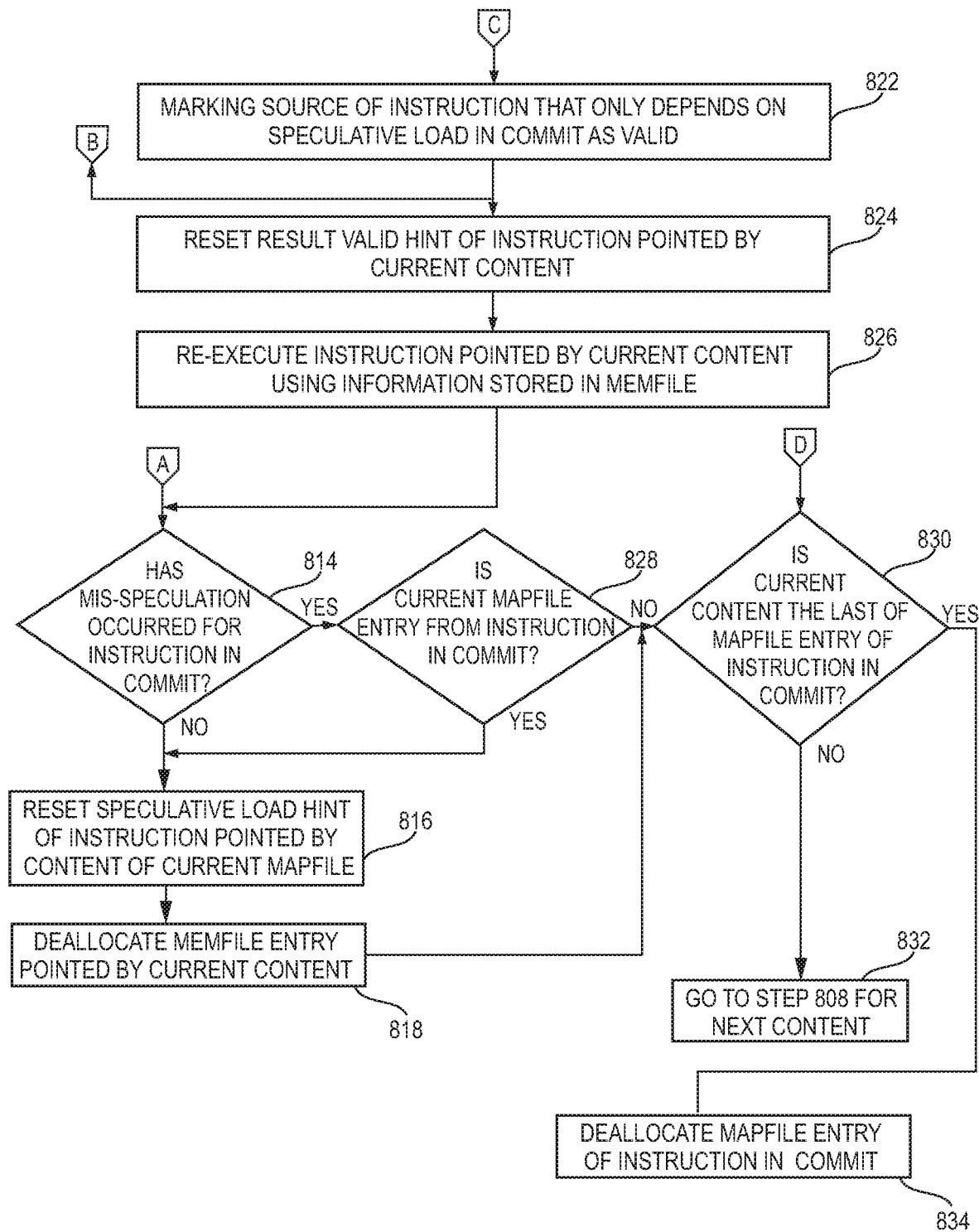

FIGS. 9A and 9B collectively show a flow diagram of a method 900 for facilitating a memory mis-speculation recovery in a commit stage, in accordance with another example embodiment. More specifically, the method 900 is directed towards optimizing power efficiencies compared to the method 800 of FIGS. 8A and 8B. The method 900 depicted in the flow diagram may be executed by, for example, an apparatus or a system. The Operations of the flow diagram 900, and combinations of operation in the flow diagram 900, may be implemented by, for example, hardware, hardware simulator, firmware, a processor, circuitry and/or a different device associated with the execution of software that includes one or more computer program instructions.

The main differences between FIGS. 9A and 9B and FIGS. 8A and 8B are the handling of cases where the MAPFILE entry content points to another speculative load (check in step 808 returns true) or an instruction with source provided by another speculative load (check in step 812 returns true). In both cases, when there is a mis-speculation detected for speculative load in commit, those instructions have already consumed incorrect source thus requires re-execution. However, the results generated after re-execution can still be wrong if mis-speculation occurred at the other speculative load associated with those instructions. So instead of re-executing them right away, an optimization focusing on power efficiency is to re-execute those instructions only after the last speculative load associated with each instruction gets resolved in commit. This is achieved via a re-execution hint.

The re-execution hint is set for another speculative load instruction (step 808 returns true) or an instruction with source provided by another speculative load (step 812 returns true) when that instruction is pointed by dependency data of a mis-speculated load in commit (step 810 returns true). The re-execution hint is examined for instructions only depending on speculative load in commit. An instruction is re-executed if the hint is set to valid. In other words, mis-speculation occurred on a speculative load consumed by instructions with the dependency of another speculative load are not immediately triggered for re-execution. Instead, those instructions only start re-execution when the last speculative load associated with each instruction is in commit. At that time, it is confirmed that the results generated after re-execution are valid.

By utilizing the re-execution hint, power efficiency can be further optimized by avoiding multiple re-execution in case of more than one mis-speculation having occurred on speculative loads associated with the same instruction. This is especially helpful if current dependency data contents point to other speculative loads. As per the method 800, not only those speculative loads themselves get re-executed, but all contents of their dependency data entries are iterated and re-executed as well. By delaying re-execution after the last speculative load an instruction depends on reaches commit stage, instructions associated with multiple speculative loads would only require single re-execution regardless of how many load mis-speculations has occurred, which further increases overall power efficiency.

Added steps to achieve the aforementioned changes are described below. The method 900 starts at operation 902. At 808, it is determined that current content points to another speculative load, other than the speculative load in commit, and mis-speculation has occurred for instruction in commit (step 820 is true), power optimization mode validity is checked in 902. If it is false, the process of mis-speculated load handling defaults to the flow of FIGS. 8A and 8B which iterates over its dependency data entries. If it is true, re-execution hint is set to valid for all the recovery metadata entries in current content's dependency data entry at 904. At 812, if it is determined that the instruction has a source depending on a speculative load other than the speculative load in commit, and mis-speculation has occurred (906 is true), power optimization mode validity is checked in 908. If it is false, the process of mis-speculated load handling defaults to the flow of FIGS. 8A and 8B which re-executes all consumer instruction immediately, proceeding to 822. If it is true, re-execution hint for recovery metadata entry pointed by current content is set to valid as an indication that mis-speculation has occurred on speculative load consumed by current instruction at 910.

Instructions with re-execution hint set to valid gets re-executed only after the last speculative load associated with them reaches commit stage. At this point, those instructions have turned into instructions that are only depended on the speculative load in commit (when both check 808 and check 812 fails). Then even if the speculative load is valid in commit, the re-execution hint is still examined at 912 and if true, triggers instruction re-execution from step 824.

Thus, a re-execution hint is set to valid for an instruction from the set of multiple speculative load dependent instructions where a speculative load from one or more of speculative loads is a current instruction and the speculative load is the mis-speculated load at the instruction commit stage. Further, a speculative load dependent instruction from the set of speculative load dependent instructions that is dependent only on a speculative load is re-executed based on reading the re-execution hint set as valid. The rest of steps are the same as FIG. 8.

Figure 10:
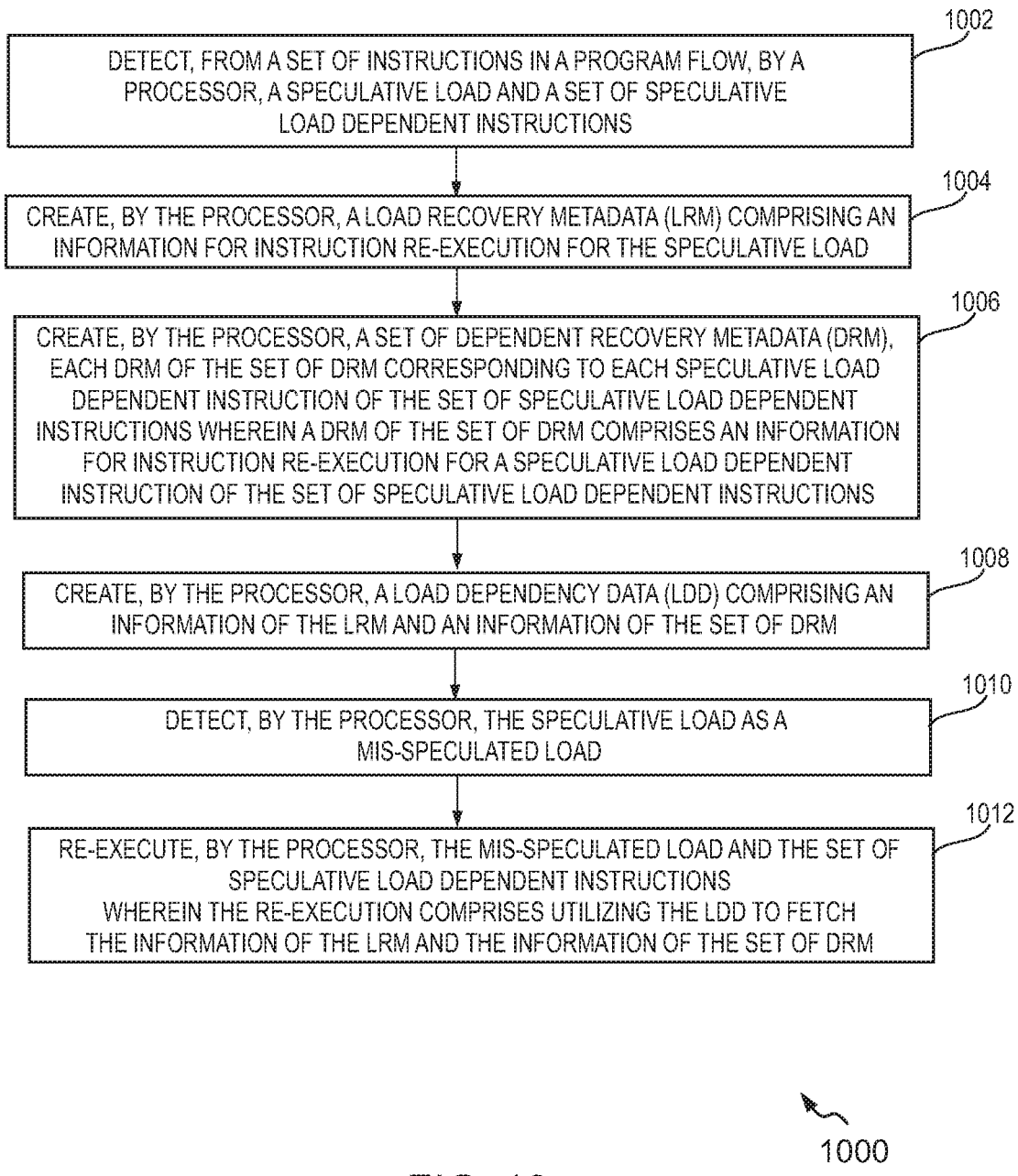
FIG. 10 illustrates a flow diagram of a method for facilitating a memory mis-speculation recovery, in accordance with an example embodiment.

FIG. 10 illustrates a flow diagram of a method 1000 for facilitating a memory mis-speculation recovery, in accordance with an example embodiment. The method 1000 depicted in the flow diagram may be executed by, for example, an apparatus or a system operating on one or more processors such as the processor 100. The Operations of the flow diagram 1000, and combinations of operation in the flow diagram 1000, may be implemented by, for example, hardware, hardware simulator, firmware, a processor, circuitry and/or a different device associated with the execution of software that includes one or more computer program instructions. The method 1000 starts at operation 1002.

At 1002, the method 1000 includes detecting from a set of instructions in a program flow, by a processor, a speculative load and a set of speculative load dependent instructions. For example, the processor is a processor 100 of FIG. 1.

At 1004, the method 1000 includes creating, by the processor, a Load Recovery Metadata (LRM). The LRM includes an information for instruction re-execution for the speculative load.

At 1006, the method 1000 includes creating, by the processor, a set of Dependent Recovery Metadata (DRM). Each DRM of the set of DRM corresponds to each speculative load dependent instruction of the set of speculative load dependent instructions. A DRM of the set of DRM includes an information for instruction re-execution for a speculative load dependent instruction of the set of speculative load dependent instructions.

At 1008, the method 1000 includes creating, by the processor, a Load Dependency Data (LDD). The LDD includes an information of the LRM and an information of the set of DRM.

At 1010, the method 1000 includes detecting, by the processor, the speculative load as a mis-speculated load. Detection of the speculative load as a mis-speculated load is an inbuilt operation of the processor. This is achieved by verifying the correctness of speculative load at an instruction commit stage.

At 1012, the method 1000 includes re-executing, by the processor, the mis-speculated load and the set of speculative load dependent instructions at the instruction commit stage, if the speculative load is detected as mis-speculated at 1010. The re-execution comprises utilizing the LDD to fetch the information of the LRM and the information of the set of DRM.

Figure 11:
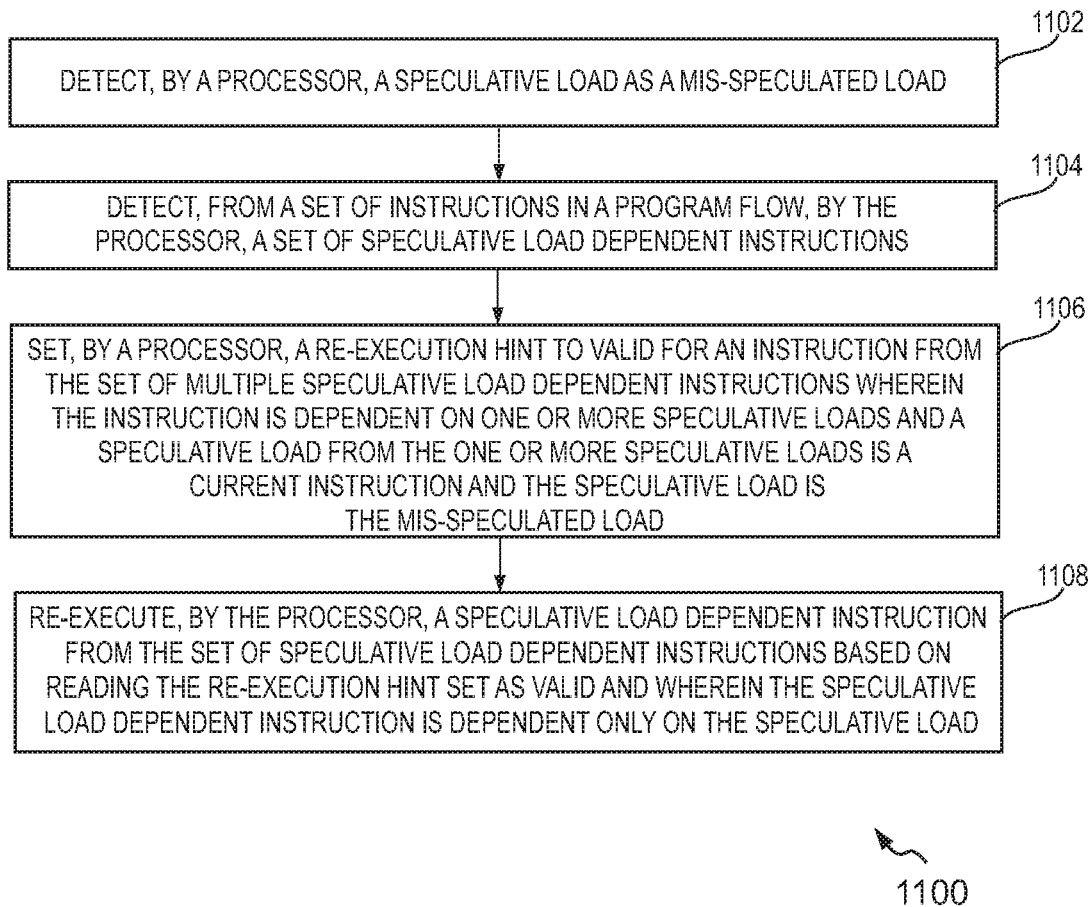
FIG. 11 illustrates a flow diagram of another method for facilitating a memory mis-speculation recovery, in accordance with an example embodiment.

FIG. 11 illustrates a flow diagram of another method 1100 for facilitating a memory mis-speculation recovery, in accordance with an example embodiment. The method 1100 depicted in the flow diagram may be executed by, for example, by an apparatus operating on the processor 100. The Operations of the flow diagram 1100, and combinations of operation in the flow diagram 1100, may be implemented by, for example, hardware, hardware simulator, firmware, a processor, circuitry and/or a different device associated with the execution of software that includes one or more computer program instructions. The method 1100 starts at operation 1102.

At 1102, the method 1100 includes detecting, by a processor, a speculative load as a mis-speculated load.

At 1104, the method 1100 includes detecting, from a set of instructions in a program flow, by the processor, a set of speculative load dependent instructions.

At 1106, the method 1100 includes setting, by the processor, a re-execution hint to valid for an instruction from the set of multiple speculative load dependent instructions. The instruction is dependent on one or more speculative loads and a speculative load from the one or more speculative loads is a current instruction and the speculative load is the mis-speculated load.

At 1108, the method 1100 includes re-executing a speculative load dependent instruction from the set of speculative load dependent instructions based on reading the re-execution hint set as valid. The speculative load dependent instruction is dependent only on the speculative load.

Figure 12:
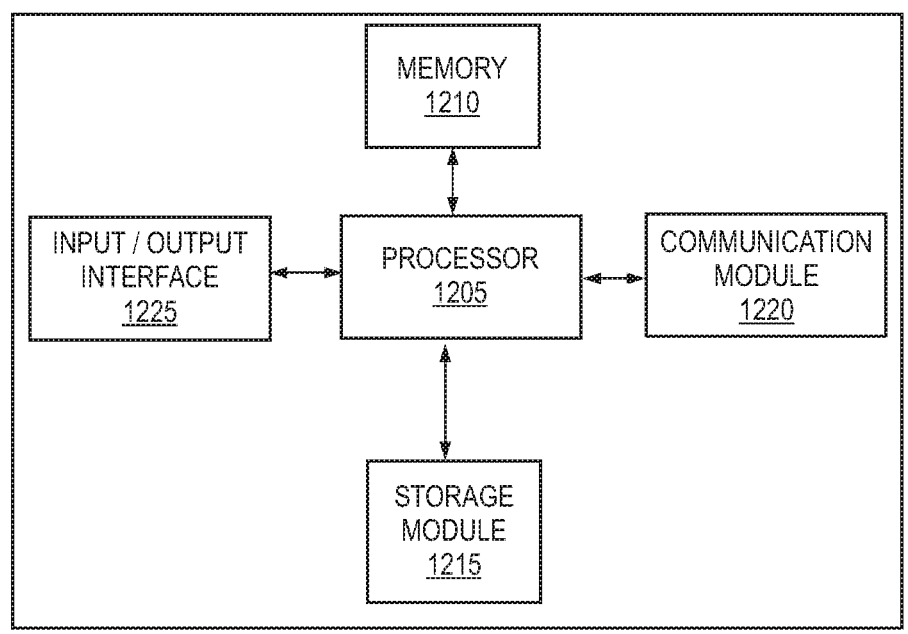
FIG. 12 is a simplified block diagram of an apparatus, in accordance with one or more embodiments of the present disclosure.

FIG. 12 is a simplified block diagram of an apparatus 1200, in accordance with one or more embodiments of the present disclosure. The apparatus 1200 is an example of a computing system that is built on top of a processor such as the processor 100 of FIG. 1. The apparatus 1200 may be implemented in forms of a portable device, cellphone, game console, tablet computer, laptop computer, desktop computer, server, workstation, domain-specific embedded system, computer-based simulator and the like. The apparatus 1200 includes a processor 1205, a memory 1210, a storage module 1215, a communication module 1220 and an Input/Output interface (I/O interface) 1225. The processor 1205 is configured for executing instructions. Instructions may be stored in, for example, but not limited to, the memory 1210. The processor 1205 may include one or more processing units (e.g., in a multi-core configuration). Physically, one or more modules of the apparatus 1200 may be implemented on one die, across multiple dies, or across multiple PCBs.

The memory 1210 includes forms of volatile or non-volatile memory such as Dynamic Random-Access Memory (DRAM), High Bandwidth memory (HBM), Static Random Access Memory ("SRAM") and the like. The storage module 1215 may include fixed or removable storage, such as a Hard Disk Drive (HDD), Solid State Driver (SSD), Flash and the like. In addition, some examples may include supplementary flash memory installed via a PCMCIA slot.

In an embodiment, the processor 1205 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The I/O interface 1225 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like. Other examples of the Typical I/O interfaces are PCIe, SCSI, AMBA, USB, SPI, I2C, and Bridge devices such as Intel Northbridge and Intel Southbridge.

The communication module 1220 includes a transceiver for wirelessly communicating information to, or receiving information from, the remote device or other suitable display device, and/or another type of remote processing device. The communication module 1220 is also capable of facilitating operative communication with the remote devices and a cloud server using Application Program Interface (API) calls. The communication may be achieved over a communication network, such as a wired NIC or a wireless NIC.

The processor 1205 is configured to perform the various operations as explained with reference to methods 1000 and 1100. For example, the processor 1205 is configured to detect a speculative load at for example, the instruction issuing stage and create an LRM that includes information for instruction re-execution for the speculative load. The processor 1205 is further configured to detect a set of speculative load dependent instructions at the instruction issuing stage and create corresponding set of DRM that includes information for instruction re-execution for the set of speculative load dependent instructions. The processor 1205 is further configured to create an LDD of the speculative load that includes information of the LRM and information of the set of DRM. When the speculative load is detected as a mis-speculated load at the instruction commit stage by the processor 1205, the LDD is utilized by the processor 1205 to fetch the information of the LRM and the information of the set of DRM to re-execute the mis-speculated load and the set of speculative load dependent instructions at the instruction commit stage. Moreover, the processor 1205 is configured to set a re-execution hint to a valid state for an instruction that is dependent on one or more speculative loads and a speculative load from the one or more speculative loads is a current instruction with a mis-speculation. The re-execution hint is read by the processor 1205 at a stage when a speculative load dependent instruction that is dependent only on the speculative load is needed to be re-executed.

The components of the apparatus 1200 provided herein may not be exhaustive, and that the apparatus 1200 may include more or fewer components than that of depicted in FIG. 12. Further, two or more components may be embodied in one single component, and/or one component may be configured using multiple sub-components to achieve the desired functionalities. Some components of the apparatus 1200 may be configured using hardware elements, software elements, firmware elements and/or a combination thereof.

The disclosed methods with reference to FIGS. 10 and 11, or one or more operations of the methods 1000 and 1100 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 1200 and its various components such as the processor 1205 and the memory 1210 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
   detecting from a set of instructions in a program flow, by a processor, a speculative load and a set of speculative load dependent instructions;
   creating, by the processor, a Load Recovery Metadata (LRM) comprising an information for instruction re-execution for the speculative load;
   creating, by the processor, a set of Dependent Recovery Metadata (DRM), each DRM of the set of DRM corresponding to each speculative load dependent instruction of the set of speculative load dependent instructions, wherein a DRM of the set of DRM comprises an information for instruction re-execution for a speculative load dependent instruction of the set of speculative load dependent instructions;
   creating, by the processor, a Load Dependency Data (LDD) comprising an information of the LRM and an information of the set of DRM;
   detecting, by the processor, the speculative load as a mis-speculated load; and
   re-executing, by the processor, the mis-speculated load and the set of speculative load dependent instructions, wherein the re-execution comprises utilizing the LDD to fetch the information of the LRM and the information of the set of DRM.

2. The method as claimed in claim 1, further comprising:
   storing a lookup information of the LDD in each Speculative Load Dependency Data (SLDD) of a set of SLDD associated with each speculative load of a set of speculative loads, if the speculative load is dependent on each speculative load of the set of speculative loads.

3. The method as claimed in claim 2, further comprising:
   for an instruction I1 being a current instruction from the set of instructions in the program flow, reading, by the processor, a lookup information of each dependency data of one or more dependency data corresponding to each source of one or more sources of the instruction I1 from each recovery metadata of one or more recovery metadata corresponding to each source of the one or more sources of the instruction I1; and
   storing the lookup information of each dependency data in a recovery metadata of the instruction I1.

4. The method as claimed in claim 3, wherein the instruction I1 is one of the speculative load or speculative load dependent instruction from the set of speculative load dependent instructions.

5. The method as claimed in claim 4, further comprising:
   for the instruction I1 being the speculative load, storing a lookup information of a dependency data of the instruction I1 in one or more identified dependency data, the one or more identified dependency data identified based on reading the lookup information of each dependency data of the one or more dependency data corresponding to each source of the one or more sources of the instruction I1 from each recovery metadata of the one or more recovery metadata corresponding each source of the one or more sources of the instruction I1.

6. The method as claimed in claim 4, further comprising:
   for the instruction I1 being a speculative load dependent instruction from the set of speculative load dependent instructions, storing a lookup information of the recovery metadata of the instruction I1 in one or more discovered dependency data, the one or more discovered dependency data discovered based on reading the lookup information of each dependency data of the one or more dependency data corresponding to each source of the one or more sources of the instruction I1 from each recovery metadata of the one or more recovery metadata corresponding to each source of the one or more sources of the instruction I1.

7. The method as claimed in claim 1, wherein the set of instructions in the program flow further comprises a set of multiple speculative load dependent instructions.

8. The method as claimed in claim 7, further comprising:
   for an instruction I2 from the set of multiple speculative load dependent instructions,
      creating a Multi Load Recovery Metadata (MLRM) comprising an information for instruction re-execution for the instruction I2;
      creating a Multi Load Dependency Data (MLDD) comprising an information of the MLRM and an information of a set of Multi Dependent Recovery Metadata (MDRM) wherein an MDRM from the set of MDRM is a recovery metadata of an instruction dependent on the instruction I2; and
      storing a lookup information of the MLDD in each Source Dependency Data (SDD) of a set of SDD, wherein each SDD of the set of SDD is associated with each speculative load of a set of speculative loads, if the instruction I2 is dependent on each speculative load of the set of speculative loads.

9. The method as claimed in claim 7, further comprising:
   setting a re-execution hint to valid for an instruction from the set of multiple speculative load dependent instructions, wherein the instruction is dependent on one or more speculative loads and a speculative load from the one or more speculative loads is a current instruction and the speculative load is the mis-speculated load; and
   re-executing a speculative load dependent instruction from the set of speculative load dependent instructions based on reading the re-execution hint set as valid, wherein the speculative load dependent instruction is dependent only on the speculative load.

10. The method as claimed in claim 1, further comprising:
    utilizing the LDD to fetch the information of the LRM and the information of the set of DRM;
    deallocating the LRM;
    deallocating each DRM of the set of DRM except a DRM of an instruction dependent on another speculative load; and
    deallocating the LDD.

11. The method as claimed in claim 1, wherein the LRM and each DRM of the set of DRM are stored at a centralized recovery metadata structure and wherein the LDD is stored at a centralized dependency data structure.

12. An apparatus comprising:
    a storage device;
    a memory configured to store instructions; and
    a processor configured to execute the instructions stored in the memory and at least:

detect from a set of instructions in a program flow, a speculative load and a set of speculative load dependent instructions;

create and store a Load Recovery Metadata (LRM) in the storage device, the LRM comprising an information for instruction re-execution for the speculative load;

create and store a set of Dependent Recovery Metadata (DRM) in the storage device, each DRM of the set of DRM corresponding to each speculative load dependent instruction of the set of speculative load dependent instructions, wherein a DRM of the set of DRM comprises an information for instruction re-execution for a speculative load dependent instruction of the set of speculative load dependent instructions;

create and store a Load Dependency Data (LDD) in the storage device, the LDD comprising an information of the LRM and an information of the set of DRM;

detect the speculative load as a mis-speculated load; and re-execute the mis-speculated load and the set of speculative load dependent instructions, wherein the re-execution comprises utilizing the LDD to fetch the information of the LRM and the information of the set of DRM.

13. The apparatus as claimed in claim 12, wherein the processor is further configured to:

store a lookup information of the LDD in each Speculative Load Dependency Data (SLDD) of a set of SLDD associated with each speculative load of a set of speculative loads in the storage device, if the speculative load is dependent on each speculative load of the set of speculative loads.

14. The apparatus as claimed in claim 13, wherein the processor is further configured to:

for an instruction I1 being a current instruction from the set of instructions in the program flow, read the lookup information of each dependency data of one or more dependency data corresponding to each source of one or more sources of the instruction I1 from each recovery metadata of one or more recovery metadata corresponding to each source of the one or more sources of the instruction I1; and store the lookup information of each dependency data in a recovery metadata of the instruction I1 in the storage device.

15. The apparatus as claimed in claim 14, wherein the instruction I1 is one of the speculative load or a speculative load dependent instruction from the set of speculative load dependent instructions.

16. The apparatus as claimed in claim 15, wherein the processor is further configured to:

for the instruction I1 being the speculative load, store the lookup information of a dependency data of the instruction I1 in one or more identified dependency data in the storage device, the one or more identified dependency data identified based on reading the lookup information of each dependency data of the one or more dependency data corresponding to each source of the one or more sources of the instruction I1 from each recovery metadata of the one or more recovery metadata corresponding each source of the one or more sources of the instruction I1.

17. The apparatus as claimed in claim 15, wherein the processor is further configured to:

for the instruction I1 being a speculative load dependent instruction from the set of speculative load dependent instructions, store a lookup information of the recovery metadata of the instruction I1 in one or more discovered dependency data in the storage device, the one or more discovered dependency data discovered based on reading the lookup information of each dependency data of the one or more dependency data corresponding to each source of the one or more sources of the instruction I1 from each recovery metadata of the one or more recovery metadata corresponding to each source of the one or more sources of the instruction I1.

18. The apparatus as claimed in claim 12, wherein the set of instructions in the program flow further comprises a set of multiple speculative load dependent instructions.

19. The apparatus as claimed in claim 18, wherein the processor is further configured to:

for an instruction I2 from the set of multiple speculative load dependent instructions, create and store a Multi Load Recovery Metadata (MLRM) in the storage device, the MLRM comprising an information for instruction re-execution for the instruction I2;

create and store a Multi Load Dependency Data (MLDD) in the storage device, the MLDD comprising an information of the MLRM and an information of a set of Multi Dependent Recovery Metadata (MDRM), wherein an MDRM from the set of MDRM is a recovery metadata of an instruction dependent on the instruction I2; and store a lookup information of the MLDD in each Source Dependency Data (SDD) of a set of SDD in the storage device, wherein each SDD of the set of SDD is associated with each speculative load of a set of speculative loads, if the instruction I2 is dependent on each speculative load of the set of speculative loads.

20. The apparatus as claimed in claim 18, wherein the processor is further configured to:

set a re-execution hint to valid for an instruction from the set of multiple speculative load dependent instructions wherein the instruction is dependent on one or more speculative loads and a speculative load from the one or more speculative loads is a current instruction and the speculative load is the mis-speculated load; and re-execute a speculative load dependent instruction from the set of speculative load dependent instructions based on reading the re-execution hint set as valid, wherein the speculative load dependent instruction is dependent only on the speculative load.

21. The apparatus as claimed in claim 12, wherein the processor is further configured to:

utilize the LDD to fetch the information of the LRM and the information of the set of DRM;

deallocate the LRM;

deallocate each DRM of the set of DRM except a DRM of an instruction dependent on another speculative load; and deallocate the LDD.

22. The apparatus as claimed in claim 12, wherein the LRM and each DRM of the set of DRM are stored at a centralized recovery metadata structure and wherein the LDD is stored at a centralized dependency data structure.

23. A computer-implemented method, comprising:

detecting, by a processor, a speculative load as a mis-speculated load;

detecting, from a set of instructions in a program flow, by the processor, a set of speculative load dependent instructions;

setting, by the processor, a re-execution hint to valid for an a speculative load dependent instruction from the set of speculative load dependent instructions, wherein the speculative load dependent instruction is dependent on one or more speculative loads and a speculative load from the one or more speculative loads is a current instruction and the speculative load is the mis-speculated load; and re-executing, by the processor, a speculative load dependent instruction from the set of speculative load dependent instructions based on reading the re-execution hint set as valid, and wherein the speculative load dependent instruction is dependent only on the speculative load.

24. A computer program product comprising at least one non-transitory computer-readable storage medium, the non-transitory computer-readable storage medium comprising a set of instructions, which, when executed by one or more processors, cause an apparatus to at least perform:

detect from a set of instructions in a program flow a speculative load and a set of speculative load dependent instructions;

create a Load Recovery Metadata (LRM) comprising an information for instruction re-execution for the speculative load;

create a set of Dependent Recovery Metadata (DRM), each DRM of the set of DRM corresponding to each speculative load dependent instruction of the set of speculative load dependent instructions, wherein a DRM of the set of DRM comprises an information for instruction re-execution for a speculative load dependent instruction of the set of speculative load dependent instructions;

create a Load Dependency Data (LDD) comprising an information of the LRM and an information of the set of DRM;

detect the speculative load as a mis-speculated load; and re-execute the mis-speculated load and the set of speculative load dependent instructions, wherein the re-execution comprises utilizing the LDD to fetch the information of the LRM and the information of the set of DRM.

* * * * *